US008187078B2

(12) United States Patent
Okada

(10) Patent No.: US 8,187,078 B2
(45) Date of Patent: *May 29, 2012

(54) GAME SERVER, GAME MACHINE, AND GAME CONTROL METHOD

(75) Inventor: Kazuo Okada, Koutou-ku (JP)

(73) Assignee: Universal Entertainment Corporation, Koto-Ku, Tokyo (JP)

( * ) Notice: Subject to any disclaimer, the term of this patent is extended or adjusted under 35 U.S.C. 154(b) by 449 days.

This patent is subject to a terminal disclaimer.

(21) Appl. No.: 12/183,720

(22) Filed: Jul. 31, 2008

(65) Prior Publication Data

US 2008/0293496 A1 Nov. 27, 2008

Related U.S. Application Data

(63) Continuation of application No. 10/262,106, filed on Oct. 2, 2002, now abandoned.

(30) Foreign Application Priority Data

Oct. 2, 2001 (JP) ................................ 2001-306773

(51) Int. Cl.
*A63F 9/24* (2006.01)
*A63F 13/00* (2006.01)

(52) U.S. Cl. ................ 463/20; 463/16; 463/25; 463/29; 463/42; 273/138.1; 273/138.2; 273/143 R

(58) Field of Classification Search ................ 463/1, 16, 463/20, 25, 29, 42; 273/138.1–2, 143 R
See application file for complete search history.

(56) References Cited

U.S. PATENT DOCUMENTS

| | | | |
|---|---|---|---|
| 4,283,709 | A | 8/1981 | Lucero et al. |
| 4,624,459 | A | 11/1986 | Kaufman |
| 4,652,998 | A | 3/1987 | Koza et al. |
| 4,657,256 | A | 4/1987 | Okada |
| 4,669,731 | A | 6/1987 | Clarke |
| 4,718,672 | A | 1/1988 | Okada |
| 4,775,937 | A | 10/1988 | Bell |
| 4,837,728 | A | 6/1989 | Barrie et al. |
| 4,964,638 | A | 10/1990 | Ishida |
| 4,993,713 | A | 2/1991 | Harada |

(Continued)

FOREIGN PATENT DOCUMENTS

DE 32 42 890 A1 5/1984

(Continued)

OTHER PUBLICATIONS

"Pachi-Slot Hisshogaido", Byakuya-Shobo Co., Ltd., 7th Volume, No. 14, Oct. 1, 1996, pp. 88-89 (with English Abstract).

(Continued)

*Primary Examiner* — Dmitry Suhol
*Assistant Examiner* — Ryan Hsu
(74) *Attorney, Agent, or Firm* — Lexyoume IP Group, PLLC.

(57) ABSTRACT

In a collective control of plural game machines placed in the same parlor, it is detected whether there is a player change with each game machine and, based on the detection result, the cumulative credit consumption with each game machine is controlled per player. When the cumulative credit consumption of a certain player reaches a predetermined upper limit, return is executed to this player. The upper limit value is changed properly. Therefore, the player can perform a game without anxiety while enjoying amusement of the game. As the result, it may be avoided losing customers.

15 Claims, 14 Drawing Sheets

U.S. PATENT DOCUMENTS

| | | | | |
|---|---|---|---|---|
| 5,010,995 | A | 4/1991 | Okada | |
| 5,131,655 | A * | 7/1992 | Ugawa | 273/121 B |
| 5,178,390 | A | 1/1993 | Okada | |
| 5,229,764 | A | 7/1993 | Matchett et al. | |
| 5,280,909 | A | 1/1994 | Tracy | |
| 5,429,361 | A | 7/1995 | Raven et al. | |
| 5,509,655 | A * | 4/1996 | Ugawa | 273/121 B |
| 5,564,700 | A | 10/1996 | Celona | |
| 5,611,730 | A | 3/1997 | Weiss | |
| 5,639,088 | A | 6/1997 | Schneider et al. | |
| 5,655,961 | A | 8/1997 | Acres et al. | |
| 5,674,128 | A | 10/1997 | Holch et al. | |
| 5,695,402 | A | 12/1997 | Stupak | |
| 5,702,303 | A | 12/1997 | Takemoto et al. | |
| 5,768,382 | A | 6/1998 | Schneier et al. | |
| 5,770,533 | A | 6/1998 | Franchi | |
| 5,810,665 | A | 9/1998 | Takemoto et al. | |
| 5,820,459 | A | 10/1998 | Acres et al. | |
| 5,836,817 | A | 11/1998 | Acres et al. | |
| 5,836,819 | A | 11/1998 | Ugawa | |
| 5,884,274 | A | 3/1999 | Walker et al. | |
| 5,890,963 | A | 4/1999 | Yen | |
| 5,910,048 | A | 6/1999 | Feinberg | |
| 6,001,016 | A | 12/1999 | Walker et al. | |
| 6,003,013 | A | 12/1999 | Boushy et al. | |
| 6,018,718 | A | 1/2000 | Walker et al. | |
| 6,089,980 | A | 7/2000 | Gauselmann | |
| 6,113,493 | A | 9/2000 | Walker et al. | |
| 6,135,884 | A | 10/2000 | Hedrick et al. | |
| 6,196,547 | B1 | 3/2001 | Pascal et al. | |
| 6,224,482 | B1 | 5/2001 | Bennett | |
| 6,234,896 | B1 | 5/2001 | Walker et al. | |
| 6,241,608 | B1 | 6/2001 | Torango | |
| 6,244,957 | B1 | 6/2001 | Walker et al. | |
| 6,254,483 | B1 | 7/2001 | Acres | |
| 6,257,981 | B1 | 7/2001 | Acres et al. | |
| 6,270,409 | B1 | 8/2001 | Shuster | |
| 6,273,820 | B1 | 8/2001 | Haste, III | |
| 6,312,333 | B1 | 11/2001 | Acres | |
| 6,319,125 | B1 | 11/2001 | Acres | |
| 6,409,602 | B1 | 6/2002 | Wiltshire et al. | |
| 6,439,995 | B1 | 8/2002 | Hughs-Baird et al. | |
| 6,517,433 | B2 | 2/2003 | Loose et al. | |
| 6,575,832 | B1 | 6/2003 | Manfredi et al. | |
| 6,626,758 | B1 | 9/2003 | Parham et al. | |
| 6,638,165 | B2 | 10/2003 | Uchiyama et al. | |
| 6,645,078 | B1 | 11/2003 | Mattice | |
| 6,659,874 | B2 * | 12/2003 | Idaka | 463/42 |
| 6,695,697 | B1 | 2/2004 | Okada | |
| 6,854,729 | B2 * | 2/2005 | Yamaguchi | 273/121 B |
| 6,857,958 | B2 | 2/2005 | Osawa | |
| 6,932,704 | B2 | 8/2005 | Walker et al. | |
| 6,932,707 | B2 | 8/2005 | Duhamel | |
| 6,984,173 | B1 | 1/2006 | Piechowiak et al. | |
| 7,465,232 | B2 * | 12/2008 | Okada | 463/42 |
| 2002/0198039 | A1 | 12/2002 | Marks et al. | |
| 2003/0013516 | A1 | 1/2003 | Walker et al. | |
| 2003/0054873 | A1 | 3/2003 | Peterson | |
| 2003/0064809 | A1 | 4/2003 | Okada | |
| 2003/0064810 | A1 | 4/2003 | Okada | |
| 2003/0069067 | A1 | 4/2003 | Okada | |
| 2003/0069073 | A1 | 4/2003 | Okada | |
| 2003/0073486 | A1 | 4/2003 | Okada | |
| 2003/0073487 | A1 | 4/2003 | Okada | |
| 2003/0078095 | A1 | 4/2003 | Okada | |
| 2003/0119585 | A1 | 6/2003 | Walker et al. | |
| 2003/0220138 | A1 | 11/2003 | Walker et al. | |
| 2004/0048646 | A1 | 3/2004 | Visocnik | |
| 2005/0059480 | A1 | 3/2005 | Soukup et al. | |
| 2006/0009276 | A1 | 1/2006 | Okada | |
| 2007/0060250 | A1 | 3/2007 | Okada et al. | |
| 2007/0060277 | A1 | 3/2007 | Okada | |
| 2007/0060278 | A1 | 3/2007 | Okada | |
| 2007/0060279 | A1 | 3/2007 | Okada et al. | |
| 2007/0060280 | A1 | 3/2007 | Okada | |
| 2007/0060281 | A1 | 3/2007 | Okada et al. | |
| 2007/0060282 | A1 | 3/2007 | Okada et al. | |
| 2007/0060283 | A1 | 3/2007 | Okada | |
| 2007/0060324 | A1 | 3/2007 | Okada | |
| 2007/0105609 | A1 | 5/2007 | Okada | |
| 2007/0105621 | A1 | 5/2007 | Okada | |
| 2007/0105622 | A1 | 5/2007 | Okada | |
| 2007/0149269 | A1 | 6/2007 | Benbrahim | |
| 2008/0058050 | A1 | 3/2008 | Okada | |
| 2008/0058066 | A1 | 3/2008 | Okada | |
| 2008/0064473 | A1 | 3/2008 | Okada | |
| 2008/0064474 | A1 | 3/2008 | Okada | |
| 2008/0064475 | A1 | 3/2008 | Okada | |
| 2008/0064476 | A1 | 3/2008 | Okada | |
| 2008/0096632 | A1 | 4/2008 | Okada | |
| 2008/0102922 | A1 | 5/2008 | Okada | |
| 2008/0102930 | A1 | 5/2008 | Okada | |
| 2008/0119259 | A1 | 5/2008 | Okada | |
| 2008/0119262 | A1 | 5/2008 | Okada | |
| 2008/0125216 | A1 | 5/2008 | Okada | |
| 2008/0139287 | A1 | 6/2008 | Okada | |
| 2008/0139291 | A1 | 6/2008 | Okada | |
| 2008/0146310 | A1 | 6/2008 | Okada | |
| 2008/0153571 | A1 | 6/2008 | Okada | |
| 2008/0161090 | A1 | 7/2008 | Okada | |
| 2008/0214275 | A1 | 9/2008 | Okada | |
| 2008/0293482 | A1 | 11/2008 | Okada | |

FOREIGN PATENT DOCUMENTS

| | | | |
|---|---|---|---|
| DE | 37 12 841 | A1 | 11/1988 |
| DE | 4137010 | | 8/1992 |
| DE | 100 49 444 | A1 | 11/2001 |
| EP | 0631798 | | 1/1995 |
| EP | 0 840 264 | A1 | 5/1998 |
| EP | 1 192 975 | A1 | 4/2002 |
| EP | 1 302 914 | A2 | 4/2003 |
| EP | 1351180 | | 10/2003 |
| EP | 1477947 | | 11/2004 |
| EP | 1 544 811 | A2 | 6/2005 |
| GB | 2326830 | | 1/1999 |
| JP | S61-118377 | U | 7/1986 |
| JP | H04-244178 | A | 9/1992 |
| JP | 6-70951 | | 3/1994 |
| JP | H06-079051 | A | 3/1994 |
| JP | 07-171262 | | 7/1995 |
| JP | H07-299234 | A | 11/1995 |
| JP | 8-24401 | | 1/1996 |
| JP | H08-336657 | A | 12/1996 |
| JP | 9-28905 | | 2/1997 |
| JP | H08-029169 | B | 3/1997 |
| JP | 09-094340 | | 4/1997 |
| JP | H09-103567 | A | 4/1997 |
| JP | 09-264777 | | 10/1997 |
| JP | 10-33820 | | 2/1998 |
| JP | 10-94666 | | 4/1998 |
| JP | 10-118247 | | 5/1998 |
| JP | 10-234945 | | 9/1998 |
| JP | 11-19276 | | 1/1999 |
| JP | 11-146938 | | 6/1999 |
| JP | 11-253640 | | 9/1999 |
| JP | 2000-342772 | A | 12/2000 |
| JP | 2001-70510 | | 3/2001 |
| JP | 2001-204885 | A | 7/2001 |
| JP | 2001-259205 | | 9/2001 |
| JP | 2001-269441 | | 10/2001 |
| JP | 2003-47775 | | 2/2003 |
| JP | 2003-47779 | | 2/2003 |
| JP | 2003-53041 | | 2/2003 |
| JP | 2003-53042 | | 2/2003 |
| JP | 2003-71096 | | 3/2003 |
| JP | 2003-71097 | | 3/2003 |
| JP | 2003-71098 | | 3/2003 |
| JP | 2003-111888 | | 4/2003 |
| JP | 2003-111889 | | 4/2003 |
| JP | 2003-111890 | | 4/2003 |
| JP | 2003-111891 | | 4/2003 |
| JP | 2003-111897 | | 4/2003 |
| JP | 2003-117053 | | 4/2003 |
| JP | 2003-117070 | | 4/2003 |
| JP | 2003-117071 | | 4/2003 |
| JP | 2003-117072 | | 4/2003 |
| JP | 2003-117073 | | 4/2003 |

| | | | |
|---|---|---|---|
| JP | 2003-126343 | | 5/2003 |
| JP | 2003-205072 | | 7/2003 |
| WO | WO 03/083795 | A1 | 10/2003 |
| WO | WO-2004/095383 | | 11/2004 |

OTHER PUBLICATIONS

U.S. Appl. No. 11/734,834, filed Apr. 13, 2007, Okada.
U.S. Appl. No. 11/734,815, filed Apr. 13, 2007, Okada.
U.S. Appl. No. 11/735,016, filed Apr. 13, 2007, Okada.
U.S. Appl. No. 12/183,814, filed Jul. 31, 2008, Okada.
U.S. Appl. No. 12/183,721, filed Jul. 31, 2008, Okada.
U.S. Appl. No. 12/183,654, filed Jul. 31, 2008, Okada.
U.S. Appl. No. 12/183,804, filed Jul. 31, 2008, Okada.
U.S. Appl. No. 12/183,588, filed Jul. 31, 2008, Okada.
""Pachi-Slot Daizukan 2001" Byakuya-Shobo Co., Ltd. May 12, 2001, pp. 22, 24, 36".
"Trick Monster 2, Pachi-Slot Hisshogaido Max 2001, Oct. 2001" Byakuya-Shobo, Oct. 1, 2001, 4 pages (With English Abstract).
Office Action mailed Aug. 27, 2010, in co-pending U.S. Appl. No. 12/183,804.
Office Action issued Dec. 14, 2010, in Japan Patent Application No. 2007-204698.
Office Action mailed Oct. 25, 2010, in co-pending U.S. Appl. No. 11/735,104.
Office Action mailed Oct. 27, 2010, in co-pending U.S. Appl. No. 11/735,062.
Office Action mailed Oct. 12, 2010, in co-pending U.S. Appl. No. 11/735,993.
Office Action mailed Dec. 10, 2010, in co-pending U.S. Appl. No. 12/183,814.
Office Action mailed Nov. 2, 2010, in co-pending U.S. Appl. No. 12/183,654.

* cited by examiner

GAME SERVER, GAME MACHINE, AND GAME CONTROL METHOD

CROSS-REFERENCE TO RELATED APPLICATIONS

This application is based upon and claims the benefit of priority from the prior Japanese Patent Application No. 2001-306773, filed Oct. 2, 2001, the entire contents of which are incorporated herein by reference.

This application is related to co-pending U.S. patent application entitled "Game Server, Game Machine, and Game Control Method" filed on even date herewith. The co-pending application is expressly incorporated herein by reference.

FIELD OF THE INVENTION

The present invention relates to a technique of controlling return in game machines for pachislo game (Japanese slot game), pachinko (Japanese upright pinball game), etc.

BACKGROUND OF THE INVENTION

A game machine for pachislo game, pachinko, etc. is generally constructed so that the game is started when the player throws a game medium such as a medal in the game machine. The game machine of this type is set so as to pay out the game medium corresponding to the winning state (style) generated while the game is in progress.

This game machine generates a winning state, e.g., so-called "big prize (big bonus)," at a preset probability. Therefore, the player enjoys the game in expectation of big prize on the game machine with which the player is currently playing.

The game machine that produces a prize depending on the probability as described not always produces the prize at a fixed probability. That is, it is constructed so as to converge on a preset probability when a significant number of games are digested. As the result, the player performing a small number of games is likely to quickly generate a prize, and the player performing a large number of games is less likely to generate a prize. With the game machine of this type, gambling characteristics can be enhanced to make the game more amusing. On the other hand, the player less likely to generate a prize might lose enthusiasm for the game. This leads to a tendency to miss the player (customer).

In order to solve the above disadvantage, a variety of game machines have been proposed.

In a game machine disclosed in Japanese Patent Unexamined Publication No. 8-24401, there are two probability tables for controlling the probability of generating a big prize. When the player performing a large number of games is less likely to generate a prize, one of the two probability tables that has a higher probability is selected for change, thereby increasing the probability of generating the prize.

Japanese Patent Unexamined Publication Nos. 6-79051 and 11-253640 have proposed game machines employing means that is called "return." The term "return" means to repay a certain game medium per game machine on meet of a predetermined condition, in accordance with the amount of game media (e.g., medals) the player thrown in the machine. A game machine of return type in the former is constructed so as to improve game characteristics by controlling the return rate as a basis for repay of game media. A game machine of return type in the latter is constructed so as to adjust the probability of generating a prize in consideration of the profit rate in the parlor and the return rate to each game machine.

Specifically, the game machines disclosed in the above Publication Nos. 6-79051 and 11-253640 adjust the probability of generating a prize and the return rate, thereby aim at eliminating the drawback that the player having a large number of games is less likely to generate a prize, as is often with the conventional game machines.

Although the game machine of the above Publication No. 8-24401 has succeeded in eliminating unevenness in the probability of causing a prize, the following problem remains.

In this game machine, control of "unevenness" is performed per game machine. It is therefore impossible to eliminate unbalance between players. As the result, the player cannot enjoy the game without anxiety. For instance, one player plays the game with one game machine for a while, without generating any prize, and then moves to the other game machine. Immediately thereafter, the other player who sits on one game machine is likely to generate a prize. Under the circumstances, it is unavoidable that the player is in constant suspense when continuing the game with one game machine and moving to the other game machine. Hence, the problem that the player is away from the game due to such suspense, being called "missing customers," remains unsolved.

As in the game machine of the above Publication No. 8-24401, the game machines of return type in the above Publication Nos. 6-79051 and 11-253640 are constructed so as to control return per game machine. Consequently, the both machines also suffer from the same drawback, and the problem of missing customers remains unsolved.

SUMMARY OF THE INVENTION

According to the present invention, an object is to achieve the above-described technical task by enabling a player to play a game without anxiety while maintaining amusement of the game, thereby avoiding losing customers.

In accordance with the present invention, the above object can be achieved by producing higher game characteristics in the following manners comprising: (i) managing per player a cumulative credit consumption of each game machine placed in a parlor, (ii) performing payout return to a player when the cumulative credit consumption of the player reaches an upper limit; and (iii) altering the value of the upper limit properly.

(1) According to the present invention, it is assumed that a plurality of game machines are collectively (or integrally) managed by a game server, which are placed in a status enabling to start a game based on throwing of a coin or a given credit number and where a game medium payout (coin, credit, or the like) is executed based on the result of the player's game. The game server is characterized in that: (i) a cumulative credit consumption is determined based on information about the credit consumption in a game machine with which a player is playing a game; (ii) when the cumulative credit consumption reaches a predetermined upper limit, payout return is always executed based on a predetermined return rate, or payout return is executed depending on a result of a lottery for determining whether the payout return should be done; and (iii) a signal for causing a change in the above-mentioned predetermined upper limit is sent to the game machine.

With the above-described constitution, the upper limit setting that is a key for the payout return of the game machine may be changed. The player is therefore anxious about the upper limit setting, thereby improving game characteristics. Specifically, when the upper limit as the key of the payout return is set high, it is difficult to reach such upper limit so that player changes may frequently occur with the same game machine. Therefore, it is possible that only one player of the plural players, who have played games with the same game machine, may be benefited since he plays a game when the upper limit is reached. Under this circumstance, the players may have to use their own tactics for benefiting themselves, thereby producing high game characteristics. On the other hand, when the upper limit of the key to the payout return is set low, the players may perform a game without anxiety. In an alternative, the payout return may not always be executed to the player who reaches the predetermined upper limit. In this instance, the task to maintain customers without losing them due to an excessive elimination of gambling characteristics may be achieved by producing higher game characteristics and higher gambling characteristics. In another alternative, the payout return may be controlled such that it is executed based on the result of the lottery for determining whether the payout return should be done. In still another alternative to be described later, without performing any lottery to determine whether the payout return should be done, the payout return may be executed with every game machine reaching the upper limit as a so-called default payout return standard. With the above-described constitution, such a new effect as described below is expectable.

(2) Preferably, the above-mentioned payout return is executed without fail to every game machine that has reached the predetermined upper limit and based on the result of a timing determination lottery for deciding the timing of the return.

With the above-described constitution, the payout return is executed to every game machine that has reached the predetermined upper limit. With guarantee for the payout return, the player can enjoy the game without anxiety. Since the timing of the payout return is determined by lottery, the payout return is not always performed as soon as the game machine reaches the upper limit. Thereby, the game characteristics can be improved. If the game machine is constructed such that the player cannot recognize that the machine reaches the upper limit, it is possible that the player is not anxious about the upper limit setting and thus the game characteristics may not be improved. Therefore, it is preferable that the player is informed of approaching and/or reaching of the upper limit.

(3) Preferably, when one player at one game machine is not changed to another player, the payout return is executed to the one player, who has performed a game until the predetermined upper limit is reached with the one game machine.

With the above-described constitution, whether the predetermined upper limit is reached is determined per player as opposed to per game machine. Specifically, under the condition that one player who has started a game with one game machine continues the game without stopping the game until the predetermined upper limit with the one game machine is reached, the payout return is executed to the one player. This ensures a certain return to the player. If the case that one player changes game machines many times is compared to the case that one player sticks to the same game machine to continue the game, the latter has higher probability of the payout return since the cumulative credit consumption of the one player tends to reach the predetermined upper limit. Hence, the player, who knows the payout return system, is more likely to continue the game with the same game machine. As the result, it is more possible to keep customers continuing the game than the case of performing the payout return per game machine.

(4) Preferably, when one player at one game machine is changed to another player, a signal for resetting the cumulative credit consumption of the one player is sent to the one game machine.

With the above-described constitution, when one player who has started a game with one game machine stops the game before reaching a predetermined upper limit so that the one player is replaced with another player, the cumulative credit consumption of the one player (the previous player) is reset. Thereby, like the effect described in the above (3), the payout return is assured to the player who has spent game mediums or credit numbers, not to the game machine. As the result, the player can continue the game with the currently playing game machine without anxiety. It is also capable of inducing the player to continue the game until the payout return is executed. In addition, it is possible to minimize such imbalance between players who has quit playing and started the game with the same one game machine. That is, just after one player who has played a game with one game machine without reaching the predetermined upper limit moves to another game machine, another player (the following next player) takes the same game machine (one game machine) and plays his game to reach the upper limit so that the payout return is executed to the new player (another player). Consequently, there is the chance of recover customers who have been away from the game machine that performs return per game machine but involves the above-mentioned imbalance between players.

(5) Preferably, a change in a predetermined upper limit is made after one game machine of a plurality of game machines collectively (or integrally) controlled is in a status advantageous to a player.

With this constitution, the upper limit is changed (or altered) after a so-called big prize (like jackpot) occurs. Therefore, the player is able to decide whether he/she keeps on playing a game after the occurrence of the big prize. Specifically, when the upper limit is high, the player may not make a profit until the next big prize. The player, who thinks he will have a poor chance for more profits, can stop the game at this point. On the other hand, when the upper limit is low, the player may not lose much even without the big prize. Therefore, the player may decide to continue the game for a while and see how things are going on.

(6) Preferably, a change in a predetermined upper limit is made after a predetermined upper limit is reached with one game machine of a plurality of game machines under collective control (or integral management).

With this constitution, after reaching the upper limit, the upper limit is changed to a new value for the next run. That is, the upper limit remains unchanged till the upper limit is reached. Hence the player who has reached the upper limit tends to pay his/her attention to the new upper limit (next upper limit). As the result, the game characteristics can be improved. Especially in a game machine characterized in that the payout return is not always executed upon attainment of a predetermined upper limit, the player checks the next upper limit (optionally with incidental conditions) so that he/she ("he" hereafter) may use what he checked as material for deciding whether he should continue. For example, when the next upper limit is set low, even if the payout return is not yet executed, the player may continue the game without anxiety. On the other hand, when the next upper limit is set high, the game characteristics can be improved by making the player waver in his judgment as to whether he should continue the game.

(7) Preferably, a change in a predetermined upper limit is performed after the upper limit is reached with one game machine of a plurality of game machines under collective control (or integral management) so that the payout return is executed with the one game machine.

With this constitution, the upper limit change is performed after the payout return is executed. Thereby, the player can use the result of the upper limit change as material for deciding whether he should continue the game. As described above, when the next upper limit is low, the player can continue the game without anxiety, whereas the player can stop the game when it is high.

(8) Preferably, a change in a predetermined upper limit is performed based on a lottery result.

With this constitution, the game characteristics can be improved by determining the predetermined upper limit change based on the lottery result. In other words, the lottery permits a random upper limit setting. Thus, continuing low upper limits put one player in an advantageous play status, whereas continuing high upper limits put another player in a disadvantageous status. Therefore a status difference between the players can be widened.

Definition of Terms (1) The term of "game machine" may include a pachinko game machine, a slot game machine, and the like. The game machine may have a mechanism capable of performing a game so that the player may be awarded in the game by using some game medium.

(2) The term of "given credit number" may include the number of winning balls and medals, and cash amount (e.g., coins and bills) which the player throws or inserts in the game machine for playing the game. The given credit number may include data such as numerical data stored as electric money or stored in a prepaid card, etc.

(3) The term of "consumption" may include that the player intends to play a game (and actually plays the game) by using the given credit number. The credit number may be tangible or intangible.

(4) The term of "predetermined upper limit" may mean (or include) a reference which is used for the payout return to be set per game machine. For example, the upper limit may be set on the basis of: i) the number of medals or the like used in a slot game machine or the like; and ii) how many the player rotates a rotating drum of the slot game machine (i.e., the number of plays). Although the term of "upper limit" may generally be of a large or small value, the "upper limit" as applied in this specification may preferably be expressed in a numerical value of enough magnitude to be reached within a period of time that the game machine is provided by the provider of the game machine (e.g., the business hours of a parlor or the like), according to the present invention.

(5) The term of "predetermined payout return" may basically be one which varies depending on the setting of the above-mentioned predetermined upper limit. The predetermined payout return may generally be obtained by multiplying the upper limit value by a return rate (usually below 100%). For example, when the basis for the predetermined upper limit is the number of medals used in a slot game machine or the like, the payout return is executed to the player in medals. By way of example, when the basis for the predetermined upper limit is the number of plays, the payout return is executed by offering a free play to the player.

The present invention, advantage in operating the same and aims which is attained by implementing the present invention will be better appreciated from the following detailed description of illustrative embodiment thereof, and the accompanying drawings.

DETAILED DESCRIPTION OF THE PREFERRED EMBODIMENT

One preferred embodiment of the present invention will be described below in detail, referring to the accompanying drawings.

1. Overall Configuration of System

Figure 1:
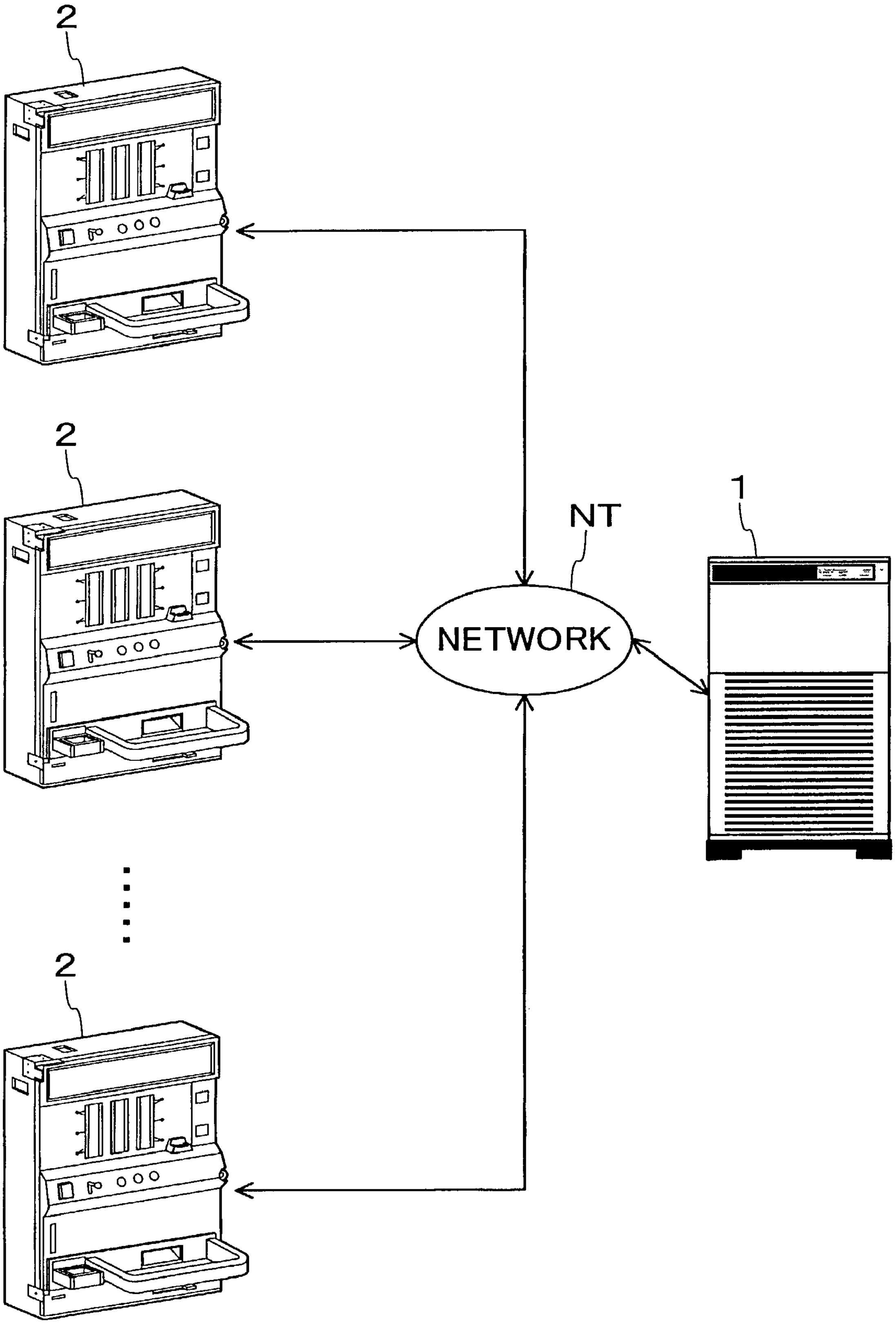
FIG. 1 is a diagram showing, in simplified form, the configuration of a credit return system according to one preferred embodiment of the present invention.

FIG. 1 is a diagram showing, in a simplified form, the configuration of a credit return system according to one preferred embodiment of the invention. Referring to FIG. 1, this credit return system comprises: i) a game server 1; and ii) plural game machines 2 placed in a single parlor.

The game machines 2 are connected via a network NT to the game server 1 and can send to and receive from the game server 1 a variety of information via the network NT. Individual identification numbers are assigned to the game machines 2.

The game server 1 collectively controls (or integrally manages) the plural game machines 2 and distinguishes the source of data sent from the game machines 2, based on the identification numbers being assigned to the game machines 2, respectively. When the game server 1 sends data to the game machine 2, the game server 1 designates the destination of the data by using the corresponding identification number.

Data sent from and received by the game machine 2 contain: i) the identification number being assigned to the game machine; and ii) identification information to identify the player currently playing with the game machine. Based on the identification information, the game server 1 determines i) whether a game is performed on the game machine 2; and ii) whether the player has been changed on the game machine 2.

Hereinafter, the game server is referred to "server."

2. Configuration of Game Machines

Figure 2:
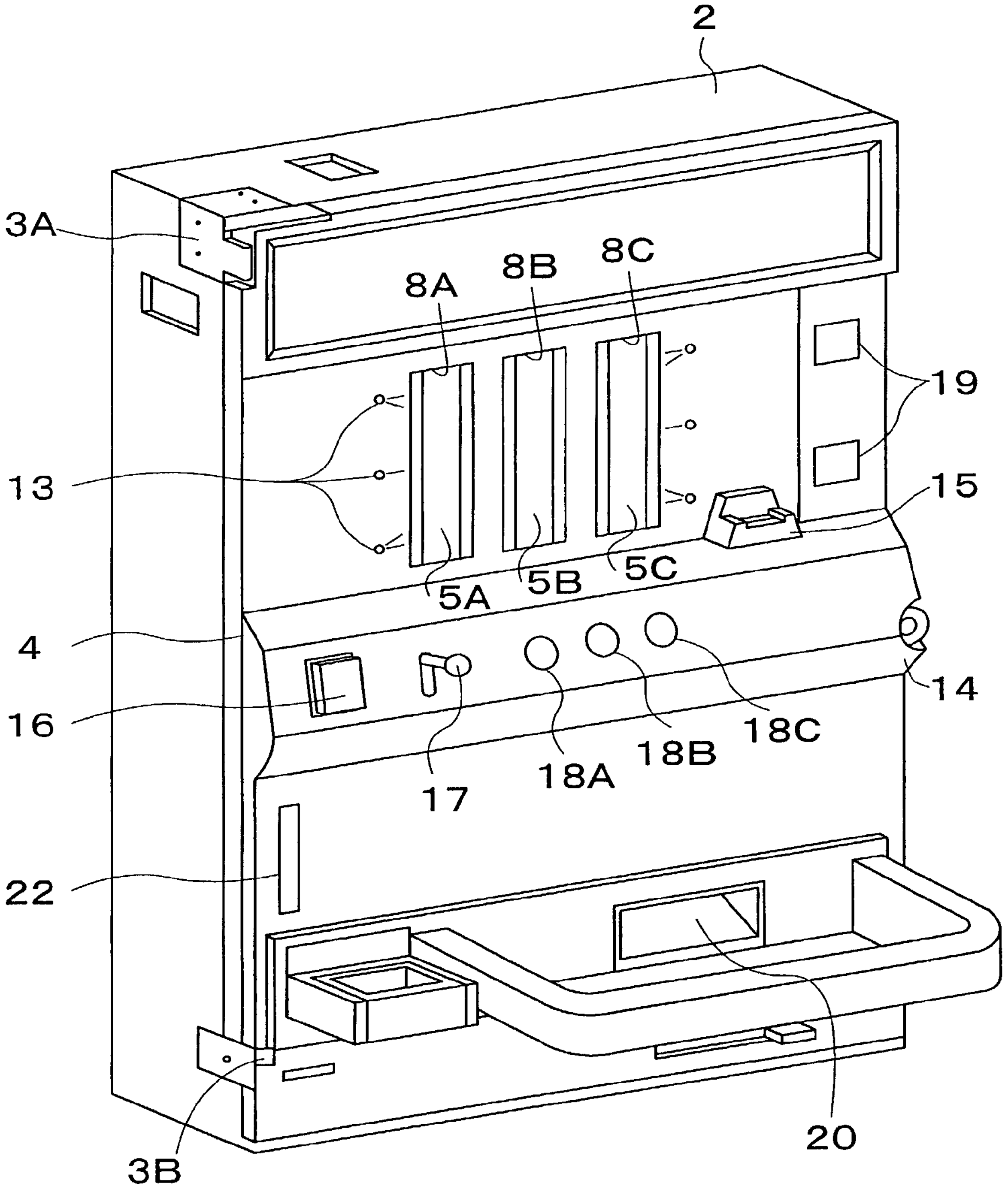
FIG. 2 is a perspective view showing the appearance of a game machine.
Figure 3:
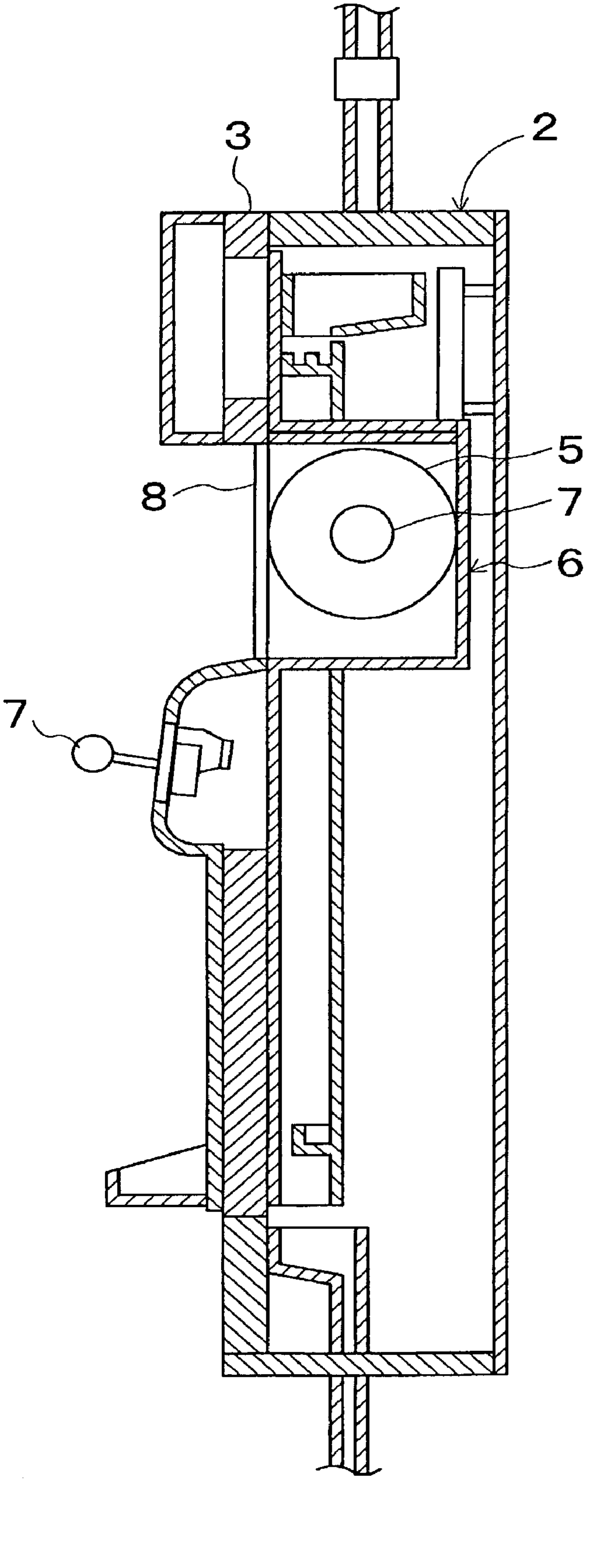
FIG. 3 is a vertical sectional view of the game machine.

FIG. 2 is a perspective view showing the appearance of the game machine. FIG. 3 is a vertical sectional view of the game machine. Referring to FIGS. 2 and 3, the game machine 2 is a slot game machine (slot machine) and has a frame body 3.

The frame body 3 is in a shape of hollow box. A front panel 4 is attached to the frame body 3 via hinges 3A and 3B so that it may be opened or shut.

Attached to the rear surface of the front panel 4 is a casing 6, with which three rotating drums 5 (5A to 5C) arranged across a width thereof are covered from their back sides.

The drums 5A to 5C are of tubular shape and are supported rotatively about the rotational axes 7. Symbol marks (e.g., figure of "7", bell, plum, cherry etc.) are respectively drawn on the peripheral surfaces of the drums 5A to 5C such that the symbol marks are aligned in a row around their peripheries. Of the symbol marks drawn on the peripheral surfaces of the drums 5A to 5C, one symbol mark per drum is visible from the front side of the game machine 2 via windows 8A to 8C disposed on the front panel 4.

The rotational axes 7 of the drums 5A to 5C is attached rotatively via bearings (not shown) to a predetermined bracket (not shown) of the frame of the game machine 2. One end of each rotary axis 7 is joined to each output axis of stepping motors 11A to 11C (see FIG. 4). Thereby, the drums 5A to 5C are rotatably driven by the stepping motors 11A to 11C, respectively, and controlled such that they are stopped at a predetermined rotational angle position by a control device 12 (see FIG. 4).

Projection parts (not shown) indicating a standard position are disposed on the peripheral end parts of the drums 5A to 5C. The control device 12 detects the rotational standard positions of the drums 5A to 5C when these projection parts cross the optical axes of optical sensors (not shown), which are disposed so as to correspond to the drums 5A to 5C. The rotational speed of the stepping motors 11A to 11C is set so as to make constant a changing speed of the displayed symbol marks.

Bet line indicator lamps 13 are disposed adjacent to the windows 8A to 8C. The lamps 13 are provided for indicating which line of plural symbol mark stop lines displayed on windows 8A to 8C has been selected as a bet object.

A control part 14 is located at approximately the mid section of the front panel 4, and a bet button 16 is disposed in the control part 14. The bet button 16 is provided for setting a bet of medals entered via a throw-in slot 15. When the player pushes the bet button 16 by the amount of medals on which the player desires to bet, the corresponding bet line indicator lamp 13 is lit up. The upper limit of bet medals is three in the game machine 2.

The bet lines may be different if the operation number of the bet button 16 is different. By one operation, a single line extending horizontally in the middle stage of the windows 8A to 8C is the object of bet line. By two operations, the object of bet line may amount to three lines obtained by adding two lines extending horizontally in the upper and lower stage of the windows 8A to 8C, to the above-mentioned line. By three operations, the object of bet line may amount to five lines obtained by adding two lines on the diagonal of the windows 8A to 8C, to the above-mentioned three lines. Four or more operations are invalid.

When a bet medal number is set according to the above-mentioned procedure, the control device 12 takes medals corresponding to the bet medal number set by the player. By taking the medals, the condition of starting a slot game is established. In this state, when the player operates a start lever 17, the control device 12 rotates the drums 5A to 5C.

The control part 14 has three stop buttons 18A to 18C disposed at locations that correspond to the drums 5A to 5C, respectively. Depressing the stop buttons 18A to 18C, the corresponding drum is stopped.

The front panel 4 has digital score indicators 19 for indicating: i) the number of medals the player threw in for the game; and ii) the number of medals to be discharged. When one of predetermined specific combinations of symbol marks (winning state) in the drums 5A to 5C is aligned on the stop line on which the player bets, a medal marks (winning state) discharge device (not shown) is driven to discharge a predetermined number of medals to a medal payout tray 20.

Further, the front panel 4 has a card inlet 22, through which the player inserts a card storing an identification number data to identify the player when he plays a game with the game machine 2. A card reader 23 (see FIG. 4) reads the data of the inserted card.

3. Configuration of Control Device of Game Machine

Figure 4:
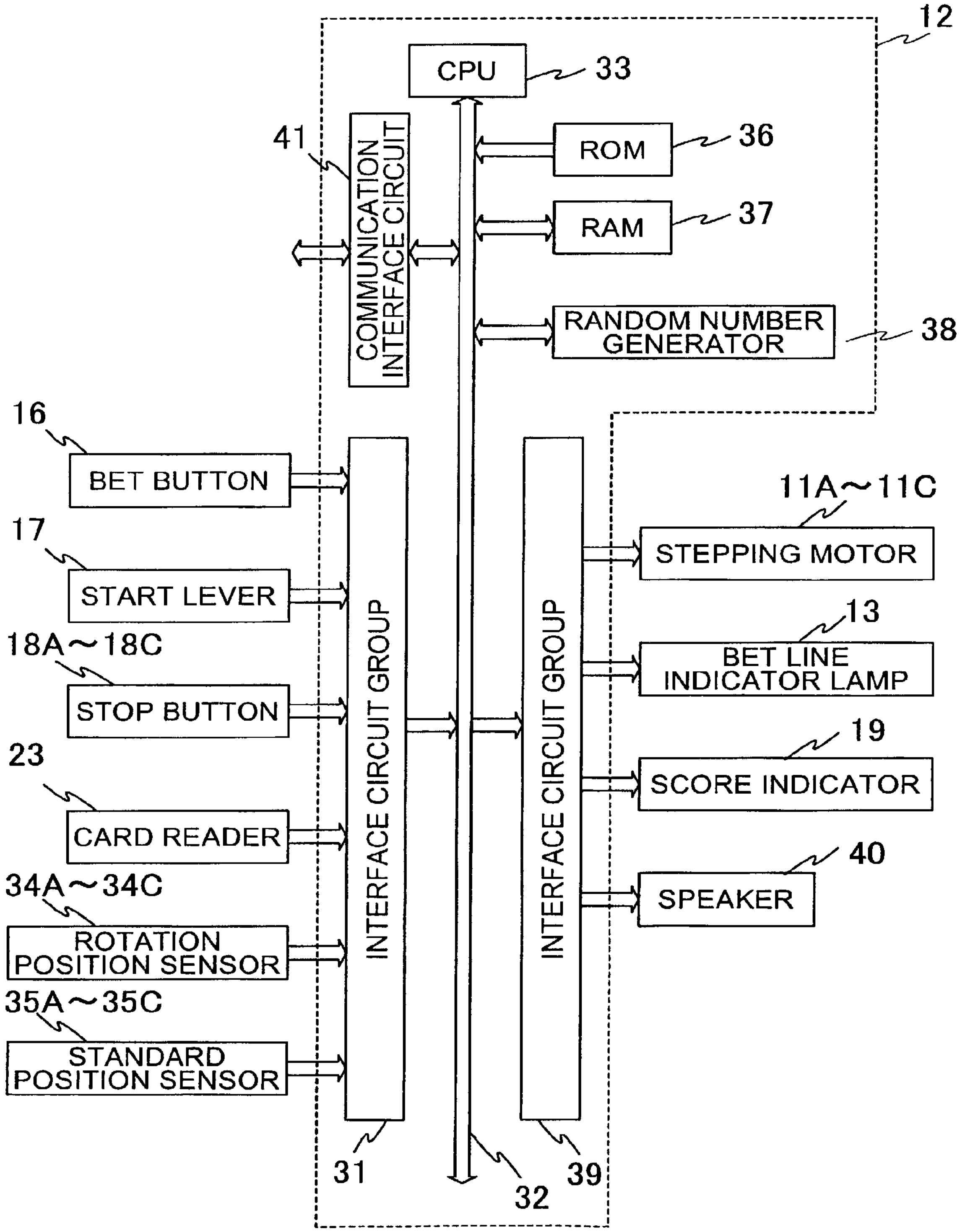
FIG. 4 is a block diagram showing the electrical configuration of the game machine.

FIG. 4 is a block diagram showing the electrical configuration of the game machine. Referring to FIG. 4, the control device 12 of the game machine 2 comprises: i) first interface circuit group 31; ii) input/output bus 32; iii) CPU 33; iv) ROM 36; v) RAM 37; vi) random number generator 38; vii) second interface circuit group 39; and viii) communication interface circuit 41.

The bet button 16 is connected to the first interface circuit group 31, which is in turn connected to the input/output bus 32. When the player depresses the bet button 16, an operation signal is transmitted from the bet button 16 to the interface circuit group 31. The interface circuit group 31 converts the operation signal to a predetermined voltage signal and provides it to the input/output bus 32. Accordingly, before starting a play, a predetermined number of medals corresponding to a value indicated by the operation signal are thrown into the game machine 2 as the object of bet.

The input/output bus 32 performs input and output of data signals or address signals to the CPU 33.

A start-up signal transmitted from the start lever 17; and stop signals transmitted from the stop buttons 18A to 18C are converted to signals of predetermined voltages by the first interface circuit group 31 and then provided to the input/output bus 32.

When the start lever 17 is operated to start a game, the start-up signal is provided to the CPU 33. Upon receipt of the start-up signal, the CPU 33 transmits a control signal to the stepping motors 11A to 11C in order to rotate the drums 5A to 5C.

When the stop buttons 18A to 18C are depressed to stop the drums 5A to 5C, the respective stop signals from the stop buttons 18A to 18C are provided to the CPU 33. If the player desires to stop the first drum 5A, he operates the stop button 18A. If he wants to stop the second drum 5B, he operates the stop button 18B. If he wants to stop the third drum 5C, he operates the stop button 18C. Upon receipt of the above stop signals, the CPU 33 transmits stop signals to the stepping motors 11A to 11C, in order to stop the drum corresponding to the operated stop buttons, respectively.

Rotational position sensors 34A to 34C are connected to the first interface circuit group 31. The sensors 34A to 34C are disposed in the vicinity of the stepping motors 11A to 11C, respectively. The sensors 34A to 34C transmit angle position signals that respectively indicate the rotational angle positions of the stepping motors 11A to 11C, to the interface circuit group 31. For example, rotary encoders can be employed as the rotational position sensors 34A to 34C.

Standard position sensors 35A to 35C are connected to the first interface circuit group 31. The sensors 35A to 35C are disposed in the vicinity of the drums 5A to 5C, respectively. The sensors 35A to 35C are optical sensors, as described above, and transmit standard position signals to the interface circuit group 31 when the respective standard positions of the drums 5A to 5C are detected.

The card reader 23, which is disposed within the game machine 2, is connected to the first interface circuit group 31. The card reader 23 transmits a card status signal at a predetermined timing, in accordance with a signal transmission demand by the CPU 33. When a card is inserted into the card inlet 22 (see FIG. 2), for example, the signal level of the card status signal becomes higher than a standard level. Based on the change in signal level, the CPU 33 detects that the card is inserted. On the other hand, when no card is inserted (i.e., the state that the card has been drawn out from the card inlet 22), for example, the level of the card status signal returns to the standard level. Based on the change of signal level, the CPU 33 detects that no card is being inserted.

The CPU 33 detects: i) an angle position signal transmitted from the rotational position sensors 34A to 34C; and ii) a standard position signal transmitted from the standard position sensors 35A to 35C, thereby obtaining (or acquiring) data of symbol marks displayed on the windows 8A to 8C.

The ROM 36 and RAM 37 are connected to the input/output bus 32. The ROM 36 stores: i) a program for controlling the game machine and returning (or paying out) medals; and ii) an initial value of a variable used in the program. The ROM 36 also stores data group indicating correspondence between a combination of symbol marks and random numbers. The RAM 37 stores flag and variable values.

The communication interface circuit 41 is connected to the input/output bus 32. The circuit 41 is used when sending and/or receiving of data between the game machine 2 and server 1 is performed.

The random number generator 38 for generating the above-described random numbers is connected to the input/output bus 32. When the CPU 33 transmits an instruction signal for generating random numbers to the random number generator 38, the random number generator 38 generates random numbers in a predetermined range and transmits signals corresponding to the random numbers to the input/output bus 32. When a random number is transmitted from the random number generator 38, in order to determine a combination of symbol marks that corresponds to the random number, the CPU 33 searches the above-described data group and then substitutes a value corresponding to the combination to variables for the variable.

Usually either normal game or special game can be played with the game machine 2.

In the normal game, there are i) an enabled prize-winning status that a combination of stopped symbol marks, which are displayed on an effective line, can match a prize-winning pattern; and ii) a disabled prize-winning status that a combination of stopped symbol marks, which are displayed on an effective line, cannot match the prize-winning pattern.

In the disabled prize-winning status, the symbol mark combinations displayed on the effective line may include i) a failure pattern and ii) a small prize pattern. The small prize pattern may include a pattern that a predetermined number of symbol marks such as "cherry" and "bell" are aligned on the effective line. If the pattern is established, a few medals are discharged to the payout tray 20. The failure pattern may be a pattern that the above-mentioned symbol marks are not aligned on the effective line. In this case, no medal is discharged. The disabled prize-winning status can be shifted to the enabled prize-winning status by an internal lottery processing to be described hereafter. In the disabled prize-winning status, no prize-winning pattern can be aligned despite the timing at which the stop buttons 18A to 18C are depressed. Hence, the normal game status may not be shifted to the special play status.

On the other hand, only in the enabled prize-winning status, a combination of stopped symbol marks, which are displayed, may match a prize-winning pattern if the stop buttons 18A to 18C are depressed at the right timing. Therefore, the status allows the player to press the buttons for "aiming the right timing (MEOSHI)." When the combination of stopped symbol marks, which are displayed on the effective line, matches the prize-winning pattern, the player wins a prize and then the game proceeds to the special game providing a chance of obtaining a large number of medals. When the player fails to obtain any prize-winning pattern by missing a timing of depressing the stop buttons 18A to 18C, the above-mentioned failure pattern or small prize pattern is aligned on the effective line. If once the enabled prize-winning status is established, the status continues until a combination of stopped symbol marks, which are displayed, matches the prize-winning pattern. And the status would not be shifted to the disabled prize-winning status.

In the special game, it is arranged that a combination of stopped symbol marks, which are displayed on the effective line, matches the small prize pattern with an extremely high probability. Therefore, it is quite likely to obtain a large number of medals. After finishing the special game, the game proceeds to the normal game. When the normal game is played after the special game, it is determined whether the game proceeds in the enabled prize-winning status or the disabled prize-winning status by an internal lottery processing to be described hereafter.

The second interface circuit group 39 is also connected to the input/output bus 32. To the circuit group 39, there is connected: i) stepping motors 11A to 11C; ii) bet line indicator lamp 13; iii) score indicator 19; and iv) speaker 40. The circuit group 39 applies a drive signal or drive power to each of these devices. For instance, when the player depresses the bet button 16, a drive current is provided to the bet line indicator lamp 13, in order to indicate a bet line that becomes effective in accordance with the number of throw-in medals. When the game (play) is over, a drive signal is provided to the score indicator 19, in order to indicate the score corresponding to the prize-winning status at that time. The speaker 40 makes an effect voice corresponding to the game status when the game is started or over.

4. Configuration of Game Server

Figure 5:
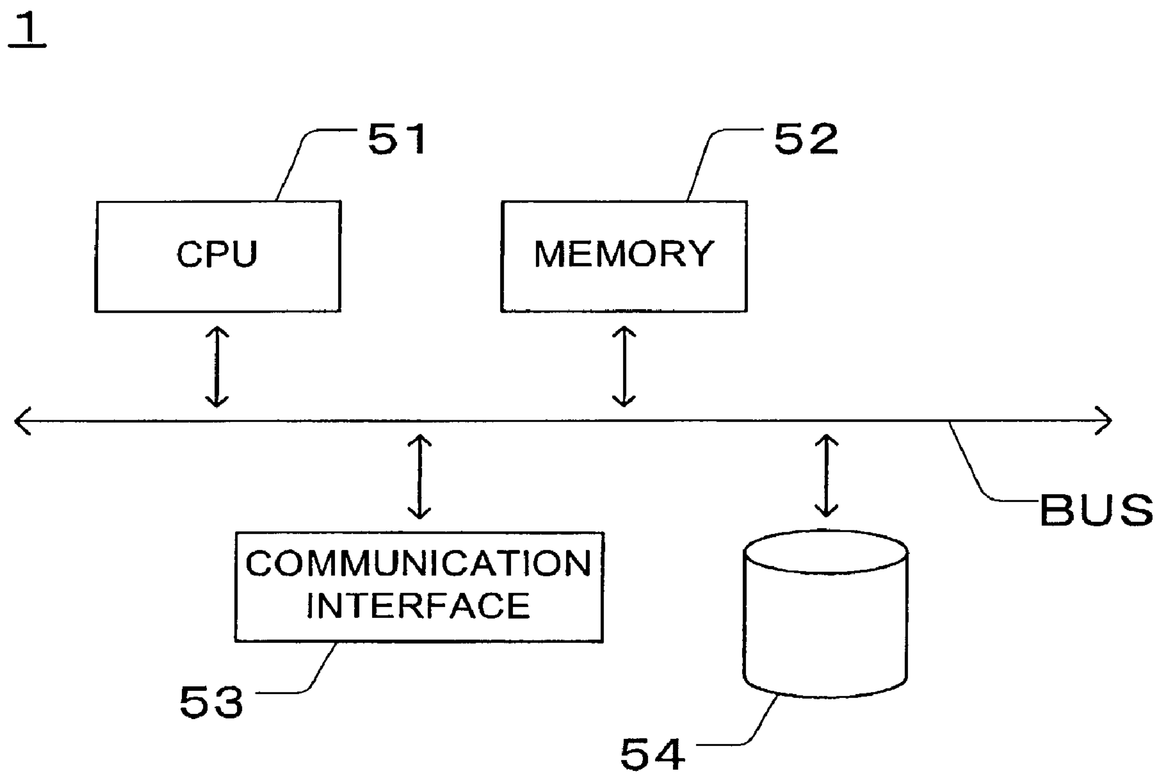
FIG. 5 is a block diagram showing the electrical configuration of a game server.

FIG. 5 is a block diagram showing the electrical configuration of the game server. Referring to FIG. 5, a server 1 has a data bus (BUS). To the data bus (BUS), there is connected i) CPU 51; ii) memory 52; iii) communication interface 53; and iv) database 54.

The CPU 51 executes various processing according to programs stored in the memory 52. Specifically, the CPU 51 receives data from the game machine 2 via a communication line connected by the communication interface 53, and stores the data in the memory 52. This data is, for example, the upper limit data and return rate data of plural game machines 2 under the control of the server 1. The data is information sent from each game machine 2 under the control of the server 1. The CPU 51 reads a program stored in the database 54 on the memory 52, and progresses the program based on the information sent from each game machine 2 that is stored in the memory 52. The progress of the program is stored in the database 54.

It is assumed in the following, for the purpose of description, that the game machine 2 is activated in advance, and flags and variables are initialized to a predetermined value.

5. Flow of Control of Game Machines

Figure 6:
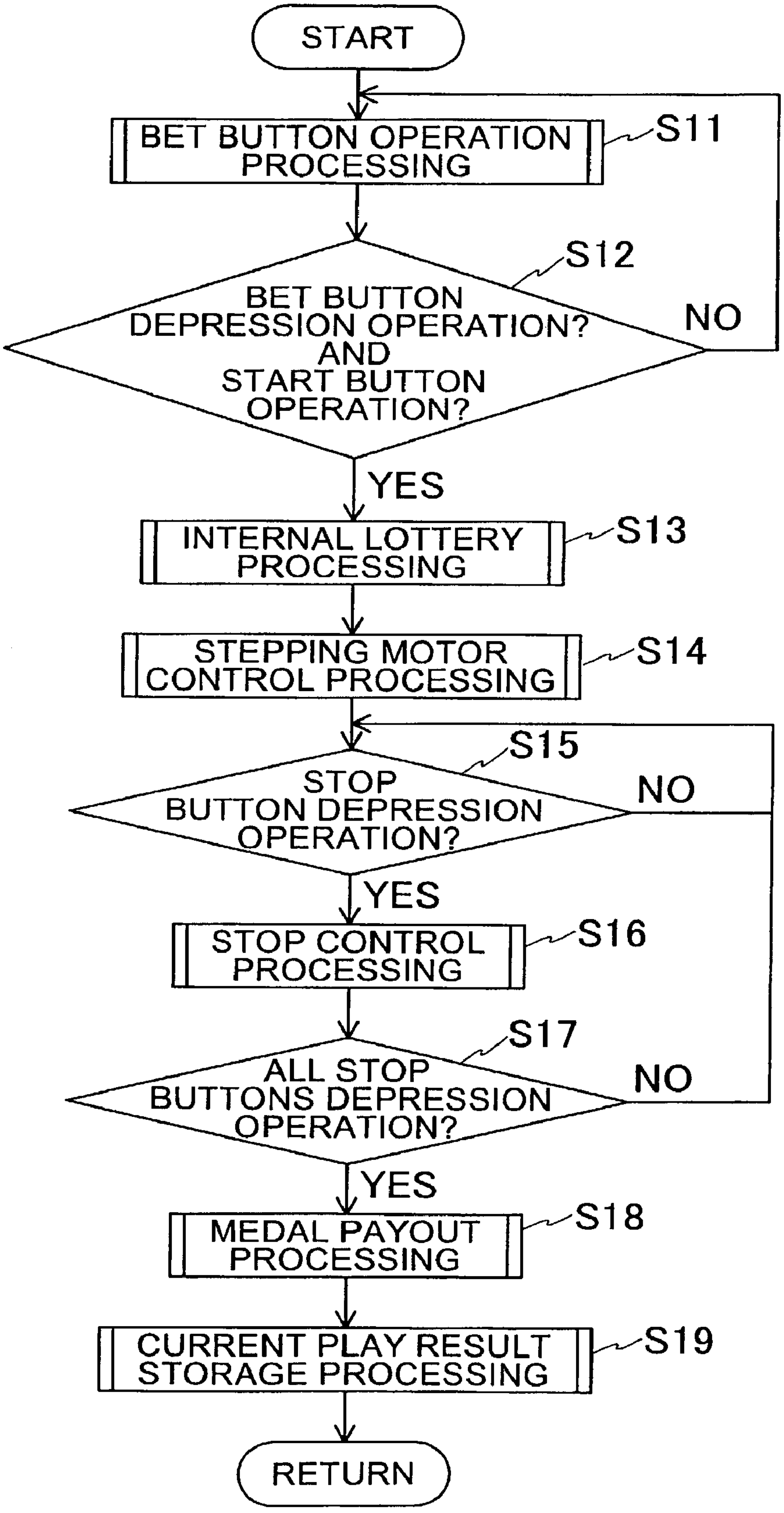
FIG. 6 is a flowchart showing the flow of control of the game machine.

FIG. 6 is a flowchart showing the flow of control of game machines. Referring to FIG. 6, firstly, the CPU 33 of the game machines 2 performs a bet-button operation processing in which it is determined whether the player pushes the bet button 16 (step S11). The bet-button operation processing is executed in accordance with the operation of depressing the bet button 16, and includes the following processing: i) detecting whether an operation signal is transmitted from the bet button 16 in response to an operation to the bet button 16, thereby storing the number of throw-in medals with the operation; and ii) transmitting a drive signal to the bet line indicator lamp 13, in order to indicate the bet line that becomes effective in accordance with the number of throw-in medals.

Upon completion of the bet-button operation processing, the CPU 33 determines whether the pressing operation of the bet button 16 is performed and the operation of the start lever 17 is performed (step S12). When the CPU 33 determines both operations are performed, the CPU 33 shifts the processing to step S13. When the CPU 33 determines both are not performed or none of these operations are performed, the CPU 33 returns the processing to step S11, and performs the bet-button operation processing again. As will be described hereafter, a period of time that all the drums 5A to 5C are started to rotate and are brought into a stop state is a sequence of game (play).

Proceeding to step S13, the CPU 33 executes an internal lottery. The internal lottery may include the processes of: i) controlling the random number generator 38 to generate a random number; ii) searching a data group indicating the correspondence between combinations of symbol marks and random numbers; and iii) determining a combination of symbol marks in accordance with the generated random number. The combination of symbol marks, which are stopped and displayed on the previous game, is stored in the RAM 37, as will be described hereafter. In the following game, the CPU 33 reads the combination of symbol marks stored in the RAM 37 so that it is used for internal lottery processing.

In the internal lottery process, the combination of symbol marks that can be stopped and displayed is determined by the lottery, and a value indicating the lottery result is substituted for a lottery data of the currently performing game (current game lottery data). For instance, when it is in the disabled prize-winning status and in the failure pattern, the current game lottery data is set to “00”. When it is in the disabled prize-winning status and there occurs the symbol marks combination matching with the small prize pattern, the current game lottery data is set to “01”. When it is in the enabled prize-winning status, the current game lottery data is set to “12”. When it is in the special play status and in failure pattern, the current game lottery data is set to “20”. When it is in the special play status and there occurs the symbol marks combination matching with the small prize pattern, the current game lottery data is set to “21”. Instead of performing any special internal lottery processing, the stopped symbol mark may be used to check whether the player moves to an advantageous status.

Upon completion of the processing of step S13, the CPU 33 reads a subroutine about stepping motor control processing (not shown) and transmits, based on the subroutine, control signals to the stepping motors 11A to 11C, in order to drive each motor at a predetermined rotational speed (step S14). The predetermined “rotational speed” may mean a speed at which the symbol marks are changeably displayed by the rotation of the drums 5A to 5C in the above-mentioned sequence of game (play). Therefore, no transit speed immediately after the drums 5A to 5C starts rotating or immediately before they are brought into a stop may be included in the predetermined rotational speed.

In this preferred embodiment, there is a past game lottery data of the game performed in the past that corresponds to the above-mentioned current game lottery data. The past game lottery data is a data indicating the lottery result of the game performed before the current game, and the data is stored in the RAM 37. As will be described hereafter, in the normal game to which the game style is shifted after the special game is over, the past game lottery data is reset at the time of performing the first game. The past game lottery data is updated by sequentially accumulating the current game result in the previous game result.

Upon completion of the above-mentioned stepping motor control processing, the CPU 33 determines whether the player depressed any one of the stop buttons 18A to 18C in order to stop the drums 5A to 5C, and from which stop button a stop signal is transmitted (step S15). If it is determined that no stop signal is transmitted from the stop buttons 18A to 18C, the CPU 33 executes again the processing of step S15. If it is determined that a stop signal is transmitted from any one of the stop buttons 18A to 18C, the CPU 33 performs processing for stopping the stepping motors 11A to 11C (step S16). This stop control processing includes: i) controlling the random number generator 38 to generate a random number; ii) searching data group indicating the correspondence between combinations of symbol marks and random numbers; and iii) determining a combination of symbol marks in accordance with the generated random number.

The CPU 33 obtains a symbol mark currently appearing on the windows 8A to 8C, based on i) a rotational position signal transmitted from the rotational position sensors 34A to 34C; and ii) a standard position signal transmitted from the standard position sensors 35A to 35C. Based on the above-mentioned symbol mark data and the current game lottery data set in the above-mentioned internal lottery processing (step S13), the CPU 33 controls the stepping motors 11A to 11C and determines a stop position.

Although the CPU 33 stops the stepping motors 11A to 11C in accordance with the current game lottery data, if determined that any one of the stop buttons 18A to 18C is depressed, the CPU 33 can apply an additional drive to the stepping motors 11A to 11C, under a predetermined condition. For example, when no symbol mark corresponding to the current game lottery data can be stopped and displayed, the stepping motors 11A to 11C may be driven additionally for four symbol marks to the maximum. However, it is managed that a symbol mark corresponding to the current game lottery data may not be stopped and displayed if the symbol mark is not within the range of the additional four symbol marks. For instance, even when in the enabled prize-winning status two drums are already stopped with symbol marks that may match the winning pattern, it is possible that the combination of symbol marks does not match the winning pattern depending on the timing at which the player operates the stop button corresponding to the last drum. On the other hand, when in the disabled prize-winning status two drums are already stopped with symbol marks that may match the winning pattern, the stepping motors 11A to 11C are controlled so that the combination of the symbol marks does not match the winning pattern even though the player operates the stop button corresponding to the last drum at the right timing.

Upon completion of the above-mentioned stop control processing, the CPU 33 determines whether all the stop buttons 18A to 18C are depressed (step S17). In other words, in this processing of step S17, it is determined whether all stop signals transmitted in accordance with the operation of the stop buttons 18A to 18C are detected. Here, if it is determined that all of the stop buttons 18A to 18C are not operated, the CPU 33 returns the processing to step S15. If it is determined that all the stop buttons 18A to 18C are operated, the CPU 33 moves the processing to step S18.

In the processing of step S18, the CPU 33 determines whether a combination of symbol marks aligned on the line that becomes effective matches with a winning status, and performs processing of medal payout corresponding to the winning status. In this medal payout processing, if it is determined that the combination of symbol marks aligned in the effective line matches with the wining state, the CPU 33 calculates the number of payout medals corresponding to the winning status, and pays out the number of medals corresponding to the calculated number. Thereafter, the CPU 33 moves the processing to step S19. On the other hand, if it is determined that the combination of symbol marks aligned in the effective line does not match with the wining, the CPU 33 moves the processing to step S19, without executing any medal payout.

In the processing of step S19, the CPU 33 mainly performs processing for storing the current game lottery data (step S19). In this preferred embodiment, the processing for storing the current game result is terminated at the time that the CPU 33 reads the past game lottery data from the RAM 37 and stores the current game lottery data in addition to the past game lottery data in the RAM 37. Here, data indicating symbol marks actually stopped and displayed and other information may be stored as well as the current game lottery data.

6. Flow of Operation of Game Machines

Figure 7:
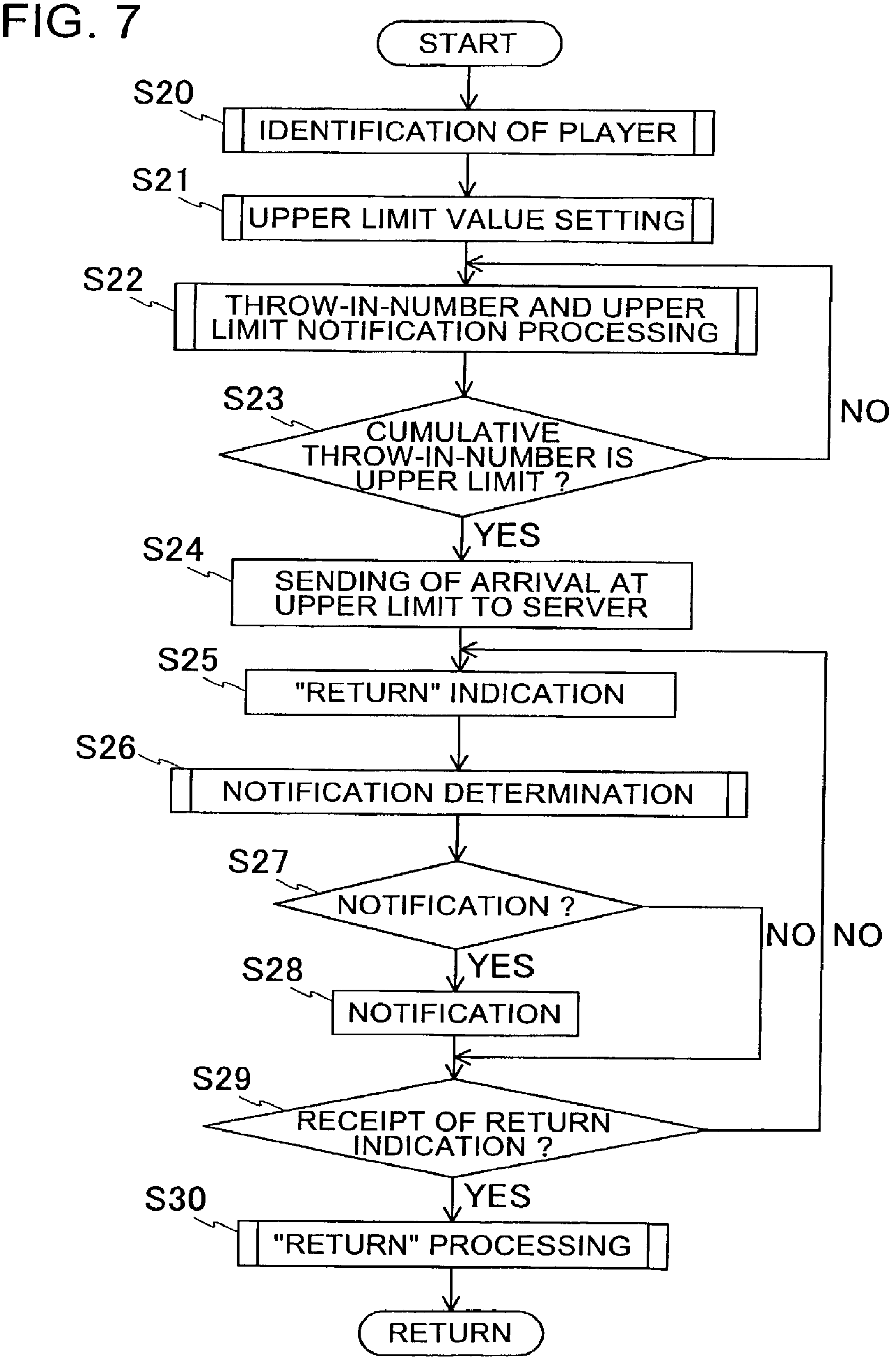
FIG. 7 is a flowchart showing the flow of operation of the game machine.

FIG. 7 is a flowchart showing the flow of operation of the game machine. The procedure shown in this flowchart is performed concurrently with the subroutine of the game machine 2 shown in FIG. 6.

Referring to FIG. 7, the game machine 2 performs the process for identifying the player (step S20). The process (hereinafter referred to as "player identification process") is executed by the CPU 33, in order to determine i) whether a game is being performed with the game machine 2; ii) who the player is if the game is performed with the game machine 2; and iii) whether the player is the same or different from the previous player.

The reason why the player identification process is particularly necessary is that the payout return is executed per player in this preferred embodiment, unlike the game machine executing the same or similar payout return per game machine. Therefore, if the player change occurs, the game (play) status about the upper limit till then is reset. Hence, it is necessary to detect the player change so as to determine who the player is.

Figure 8:
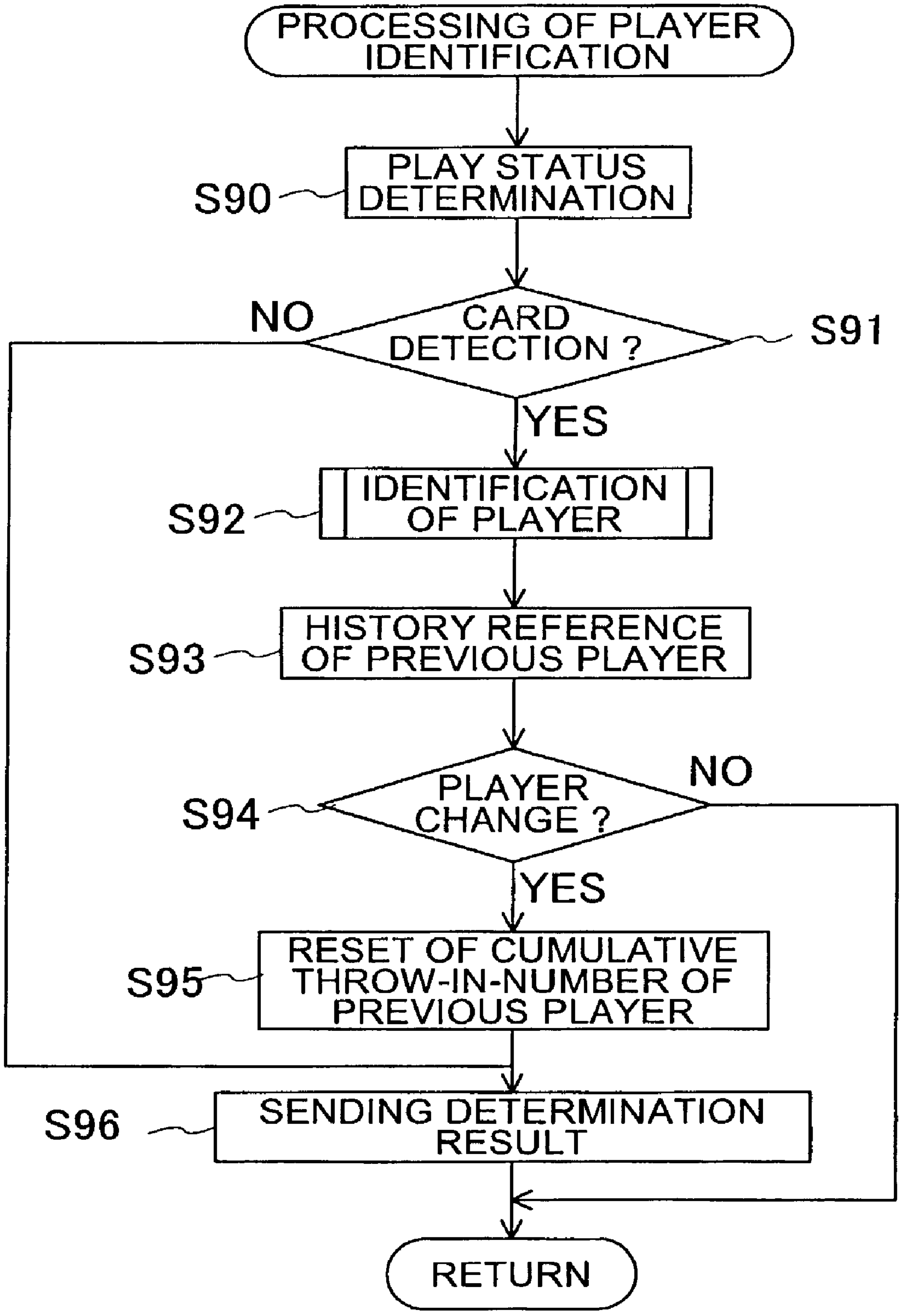
FIG. 8 is a flowchart showing the flow of operation of the game machine when performing a player identification process.

FIG. 8 is a flowchart showing the flow of operation of game machines when performing the player discrimination processing. The procedure in this flowchart corresponds to the subroutine of the player discrimination processing (step S20) shown in FIG. 7.

Referring to FIG. 8, firstly the CPU 33 of the game machine 2 determines the play status (step S90). The play status determination is a process for determining whether there is a player performing a game with the game machine 2 (i.e., whether a game is being performed with the game machine 2). When the game machine 2 is not in the play status, the following processing is not necessary. It is therefore necessary to firstly check whether the game machine 2 is in the play status. The play status determination is executed by detecting whether a card is inserted into the card inlet 22 provided on the front panel 4 of the game machine 2.

In order to check the play status, the CPU 33 determines whether a card is detected (step S91). This card detection is achieved by detecting whether the card is inserted into the card inlet 22 with the card reader 23. The card to be inserted may be an identification card storing information to identify the player, which may have any function other than identification. For example, a prepaid card storing information to identify the player may be used.

In step S91, the card detection is performed. As the result, if it is determined that no card is inserted, the CPU 33 terminates the player identification process. Thereafter, the CPU 33 of the game machine 2 sends the server 1 a signal of the identification result that no card is detected (step S96). As the contents of signals related to the card detection, for example, data "0" may be sent when no card is detected, and data "1" may be sent when a card is detected.

If it is determined that a card is inserted, the CPU 33 performs a process for identifying the player who plays a game with the game machine 2 (step S92). When a card is already inserted, the card reader 23 reads information stored in the card. In this preferred embodiment, the card inserted in the card inlet holds identification number data unique to the player in order to identify the player. Thereby, the CPU 33 of the game machine 2 can identify the player playing a game with the game machine 2 based on the identification number data.

Upon completion of the above-mentioned player identification processing, the CPU 33 refers to the previous player's history (step S93). Information of the players who have been played with the game machine 2 is stored, as history, in the RAM 37 of the game machine 2. The CPU 33 refers to the player's history stored in the RAM 37 and the identification number of the player just before receiving a signal indicating that the card has been detected.

Based on the result of the above-mentioned reference, the CPU 33 determines whether there is player change (step S94). Specifically, the CPU 33 compares the previous player identification number data that has been referred to in step S93 with the player identification number data that has been sent from the card reader 23 together with the card detection signal. And the CPU 33 determines whether there is agreement between the two. If the two data agree, the CPU 33 determines that there is no player change because it appears that the same player merely inserted the identification card again. If the two data are different, the CPU 33 determines that there is a player change. If it is determined that there is no player change, the CPU 33 completes the player identification process. If it is determined that there is a player change, the CPU 33 resets the cumulative throw-in number of the previous player (step S95). Specifically, the CPU 33 resets the data relating to the cumulative throw-in number of credit consumed by the previous player in the player's history stored in the RAM 37 that has been referred to in step S93.

This reset processing is for implementing one of the characteristic features of the present preferred embodiment, that is, performing the "payout return" per player. This means that the cumulative throw-in credit number of the player cannot be increased by adding the credit number thrown and consumed by the other players. Therefore, if a player quits playing a game with a game machine before reaching the upper limit of the cumulative throw-in credit number and moves to another game machine, this player will start to play a game with the new game machine (said another game machine) from the status that the cumulative throw-in credit number returns to "0". Thereby, the player might not often change game machines. In addition, the player is aware that there is a high probability of the payout return when the upper limit of the cumulative throw-in number is reached. This may make it possible that the player can continue the game without anxiety.

Upon completion of the above-mentioned reset processing, the CPU 33 of the game machine 2 sends the result of determination made in step S90 (step S96). Specifically, the CPU 33 sends the player's information to the server 1 via the communication interface circuit 41, network NT, and communication interface 53 of the server 1. Data to be sent may be the player's information to which the value of "1" is appended, as stated above. At this time, the past player's history information stored in the RAM 37 is rewritten with the new player's information by the CPU 33 of the game machine 2 and then the rewritten information is stored in the RAM 37.

Upon completion of the above-mentioned data sending processing, the CPU 33 repeats the player identification process.

Although in this preferred embodiment an identification card storing data to verify the player or an ID card is employed as means for identifying the player, the following means may be applicable. For example, a human sensor to detect the human body may be attached to the game machine 2. A function of weighing may be added to a stool on which the player sits for performing a game so that the player's body weight may be weighed and stored, thereby identifying the player.

Referring back to FIG. 7, upon completion of the above-mentioned sequence of player identification process, the CPU 33 of the game machine 2 performs a process for setting an upper limit value that is a standard for the payout return (step S21). By way of example, the upper limit value may be the number of medals, which may be used as a game medium for performing a game with a slot game machine, etc. When the number of medals used by a player reaches the upper limit value, the slot game machine may execute the payout return to the player.

The above-mentioned upper limit value setting may be processed in various ways. For example, i) the upper limit setting may be performed by using a preset upper limit value; ii) the owner or the like of the game machine may make the upper limit setting; or iii) the upper limit value may be automatically changed depending on the play status. The upper limit value setting that may be made in the above various ways should be performed when the game player of the game machine 2 is changed. It is preferable to set the upper limit after the result of determination whether there is player change in step S21. The result of determination whether there is player change is converted into a data, which is sent from the server 1 to the game machine 2. Specifically, in the presence of player change, the data, to which value "1" is appended, is sent. In the absence of player change, the data, to which value "0" is appended, is sent.

Hereafter, the instance of using a preset upper limit value will be explained, which is one of the above-mentioned various instances. The preset upper limit value is stored in the RAM 37. The CPU 33 reads data of the upper limit value from the RAM 37 and completes setting of the upper limit value. The instance of setting the upper limit value without using the preset upper limit value will be described later.

Upon completion of the above-mentioned upper limit value setting process, the CPU 33 performs, based on the result of the bet button operation processing (step S11) shown in FIG. 6, processes for i) adding the number of medals thrown by the player as a game medium; and ii) notifying the upper limit (step S22).

The throw-in number adding process will be presented first. A medal sensor (not shown) provided within the game machine 2 counts medals thrown in through the throw-in slot 15. The counted number data is added to a cumulative throw-in number data including the number of medals thrown in the past, which is stored as a current throw-in medal data. Here, the cumulative throw-in medal number may be referred to the cumulative consumption of credit.

The above-mentioned cumulative throw-in number data is the data stored in the RAM 37. The CPU 33 reads data of the past throw-in medal number from RAM 37, adds data of the current throw-in medal number, which is counted by the medal sensor, to the data of the cumulative throw-in medal number, and saves the result of addition as the updated cumulative throw-in number data in the RAM 37. The cumulative throw-in number data is reset in the presence of a player change, as previously described in the player identification process (step S20).

The upper limit notification process will be explained next. The upper limit notification may mean to notify the player how soon the upper limit can be reached with the game machine 2. Specific contents of the notification may include: i) the set upper limit value; ii) the current cumulative throw-in number; or iii) the rate of the cumulative throw-in number to the upper limit value (e.g., a figure or figures expressed in percentage of the upper limit, which may show the degree of the attainment).

By virtue of this notification, the player can check how long the player should play the game before the payout return is executed. As the result, the player can continue the game without anxiety. Hence, it may be preferable to provide the upper limit notification at any time. On the contrary, if it is far from the upper limit, the player might stop playing the game at that point. It is therefore preferable to design the game machine such that it may determine whether the upper limit should be notified or not depending on the play status.

In consideration of the foregoing circumstances, the upper limit notification may be made in two manners. In the first manner, the notification is executed at any time, or no notification is executed at any time (hereinafter referred to as a "first notification manner"). In the second manner, it is determined whether the notification should be executed or not depending on the play status of the player (hereinafter referred to as a "second notification manner").

Here, the first notification manner is employed, which performs the notification at any time. The instance of taking the second notification manner will be described later.

Upon completion of the above-mentioned throw-in medal number adding process and the upper-limit notification determination process, the CPU 33 determines whether the cumulative throw-in number reaches the upper limit (step S23). This determination may be achieved by comparing the cumulative throw-in number data stored in the RAM 37 in step S22 with the upper limit value set in step S21. Specifically, the CPU 33 compares these two data stored in the RAM 37 and determines whether the number of medals that the play has thrown in the game machine 2 reaches the upper limit. If it is determined that the cumulative throw-in number does not reach the upper limit value, the CPU 33 returns the processing to step S22, and continues processing for adding the number of medals that the player throws in the game machine 2. If it is determined that the cumulative throw-in number reaches the upper limit value, the CPU 33 sends the result (arriving at the upper limit) to the server 1 (step S24). Specifically, the CPU 33 of the game machine 2 sends i) a signal indicating that the cumulative throw-in number reaches the upper limit value; ii) data of the upper limit value set in step S21; and iii) data of the payout return rate that will be described later, to the server 1 via the communication interface circuit 41 of the game machine 2.

More specifically, the signal indicating arrival at the upper limit is expressed, for example, by a numerical value of "1". A signal designating the game machine 2 (i.e., data indicating which game machine out of the plural game machines under the control of the server 1) is appended to the signal indicating that the cumulative throw-in number reaches the upper limit. For example, if an identification number of "123" is assigned to the game machine 2 among the plural game machines under the control of the server 1, a signal of "123-1", wherein the numerical value of "1" indicating arrival at the upper limit is affixed to the identification number "123" of the game machine 2, is sent to the sever 1.

The upper limit value data is stored in the RAM 37, as described above. This upper limit value data is used for determining the number of returned medals when the payout return is to be executed. The number of returned medals may be calculated by multiplying the upper limit value by a return rate.

The RAM 37 of the game machine 2 stores data about the return rate used in determining how much payout return should be executed with respect to the upper limit value of the game machine 2. This return rate data is sent from the game machine 2 to the server 1.

The above-mentioned payout return rate is usually a preset numerical value. It is however possible to change the return rate in various forms, thereby increasing the game characteristics.

Upon completion of a process that the upper-limit-arrival result is sent to the server 1, the CPU 33 waits for a payout return instruction (step S25). The return instruction is a signal to be sent from the server 1 to the game machine 2, which has the cumulative throw-in number data that reaches the upper limit, and a signal to be used for controlling the timing of the return, etc. The game machine 2 is to be put in an enabled state for a player to play a game even while it is waiting for the return instruction.

In the above-mentioned return instruction waiting status, the CPU 33 performs a process for determining whether notification should be executed or not (step S26). The term of "notification" may mean to notify that the return is about to be executed to the player of the game machine 2.

By referring to the data stored in the RAM 37, the CPU 33 determines whether this notification should be executed (step S27). The RAM 37 stores data for determining execution of notification. Specifically, data of "1" is assigned for execution of notification, and data of "0" is assigned for no execution of notification. These data may be preset or set properly by the owner of the game machine, etc.

When the data stored in the RAM 37 is "1", the CPU 33 notifies the player the content that the cumulative throw-in medal number of the game machine 2 with which he is performing a game will reach the upper limit so as to execute the payout return shortly (step S28). This notification may be executed by using an illuminator provided within the game machine 2. Alternatively, the game machine 2 may have a display part performing notification to the player. Any notification means for notifying the player an upcoming payout return may be employed such that the notification means may be provided separately or integrally with the game machine 2.

When the above-mentioned notification process is completed, or when it is determined that no notification is to be executed, the CPU 33 determines whether the payout return instruction is received (step S29). The return instruction is being awaited by the game machine 2 in step S25, which is sent from the server 1. The server 1 sends the return instruction to a game machine if it is constructed so as to receive the return at any time it reaches the upper limit as well as if it is constructed such that the return is not always executed when it reaches the upper limit.

The server 1 sends a return instruction signal at a predetermined timing to the game machine 2 via the communication interface 53. In the game machine 2, the CPU 33 receives the return instruction via the communication interface circuit 41 and input/output bus 32. If it does not receive the return instruction, the CPU 33 returns the processing to step S25 and waits for the return instruction again.

Upon completion of the above-mentioned return instruction receiving process, the CPU 33 executes the return processing (step S30). This return processing is executed based on the return instruction transmitted from the server 1 in step S29. Specifically, the CPU 33 receives data that indicates how much return should be executed to the game machine 2, and executes the return based on the received data.

In the game machine receiving the return at every time the throw-in medal number reaches the upper limit, the return is executed by the amount of medals calculated mainly based on the upper limit data and the return rate data stored in the RAM 37. On the other hand, in the game machine wherein the return is not always executed when the throw-in medal number reaches the upper limit, if it is determined to execute no return, the CPU 33 performs a process for resetting the throw-in number data stored in the RAM 37, as required. This throw-in number data reset is executed by a program stored in the ROM 36 on receipt of an instruction of the CPU 33.

Upon completion of the above-mention return process, the CPU 33 moves again the processing to the upper-limit value setting processing (step S21), and repeats the above-mentioned sequence of processing.

7. Flow of Return Preparation Operation of Game Server

Figure 9:
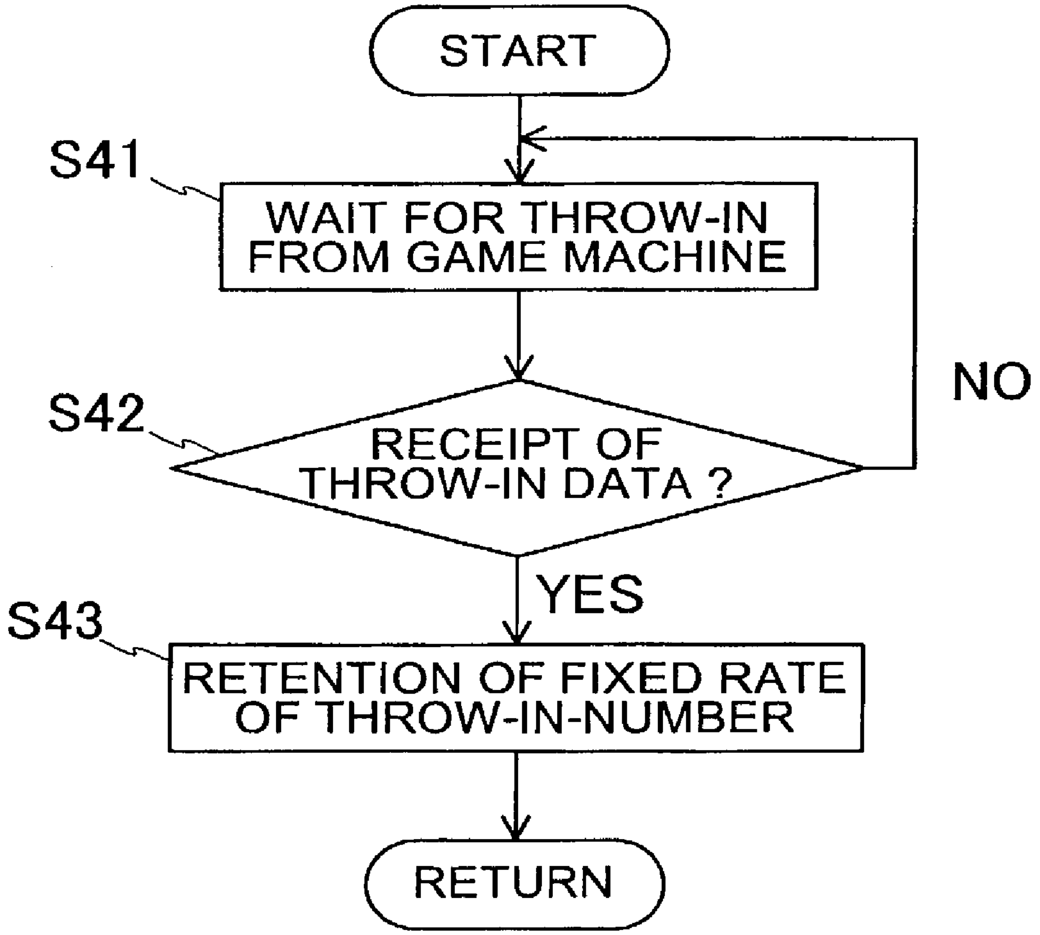
FIG. 9 is a flowchart showing the flow of operation when the game server makes preparation for payout return.

FIG. 9 is a flowchart showing the flow of operation when the game server makes preparation for the payout return. This operation is always repeated in the server 1.

The server 1 always holds some of medals serving as a game medium, which have been thrown in each game machine 2, in preparation for execution of the return to the game machine 2 under the control of the server 1 when the upper limit is reached.

Referring to FIG. 9, the server 1 is waiting for the game medium throw-in result from each game machine 2 (step S41).

As the game medium that the player uses with each game machine 2, it is possible to use any tangible matters, e.g., medals, winning balls, coins, or bills. Besides these, any intangible matters that can be expressed in a numerical value as data are also handled as a game medium in this preferred embodiment. The term of "throw-in" means the following action that a certain player makes a game machine recognize the game medium for the purpose of playing a game, irrespective of the type of the game medium. Therefore, not only a medal or the like that is thrown in through the throw-in slot 15 and detected by the medal sensor of the game machine 2, but also a numerical value data or the like that the player decides to use for a game becomes a candidate to be waited for.

In the status that the server 1 is waiting for game medium throw-in, the CPU 51 of the server 1 determines whether a game medium throw-in data is received at a predetermined timing (step S42). In this preferred embodiment, medals are used as the game medium, and the player continues the game with the game machine 2, while medals are thrown in via the throw-in slot 15. These thrown-in medals are detected and counted by the medal sensor within the game machine 2 so that the counted medal number is converted into a numerical value as data, which is stored in the RAM 37 of the game machine 2 as a cumulative throw-in number data. The cumulative throw-in number data is sent at a predetermined timing to the server 1 via the communication interface circuit 41. The server 1 receives the cumulative throw-in number data via the communication interface 53. The received cumulative throw-in number data is properly stored in the memory 52, based on an instruction of the CPU 51. In the determination processing in step 42, if the server 1 does not receive the throw-in data, the CPU 51 returns the processing to step S41.

Upon completion of the throw-in data receipt determination processing, the CPU 51 holds a predetermined percent of the throw-in number (step S43). As stated above, the server 1 is constructed so as to retain in advance game mediums for the payout return to the player performing a game with each game machine 2 under the control of the server 1. The retention amount of one server may differ from that of another server. The retention amount is determined by multiplying the cumulative throw-in number data of each game machine 2, which is received in the throw-in data receipt determination processing (step S42), by a predetermined rate (payout return rate).

In the above-mentioned retention processing, the server 1 sends a numerical value data corresponding to the retention amount calculated by the CPU 51 to the game machine 2 via the communication interface 53. In the game machine 2, the CPU 33 saves in the RAM 37 the numerical value data that is part of the cumulative throw-in number data, as retention data.

Upon completion of the above-mentioned retention processing, the server 1 returns to the status of waiting for throw-in data from each game machine 2 (step S41), and repeats the foregoing sequence of processing.

8. Flow of Return Operation of Game Server

Figure 10:
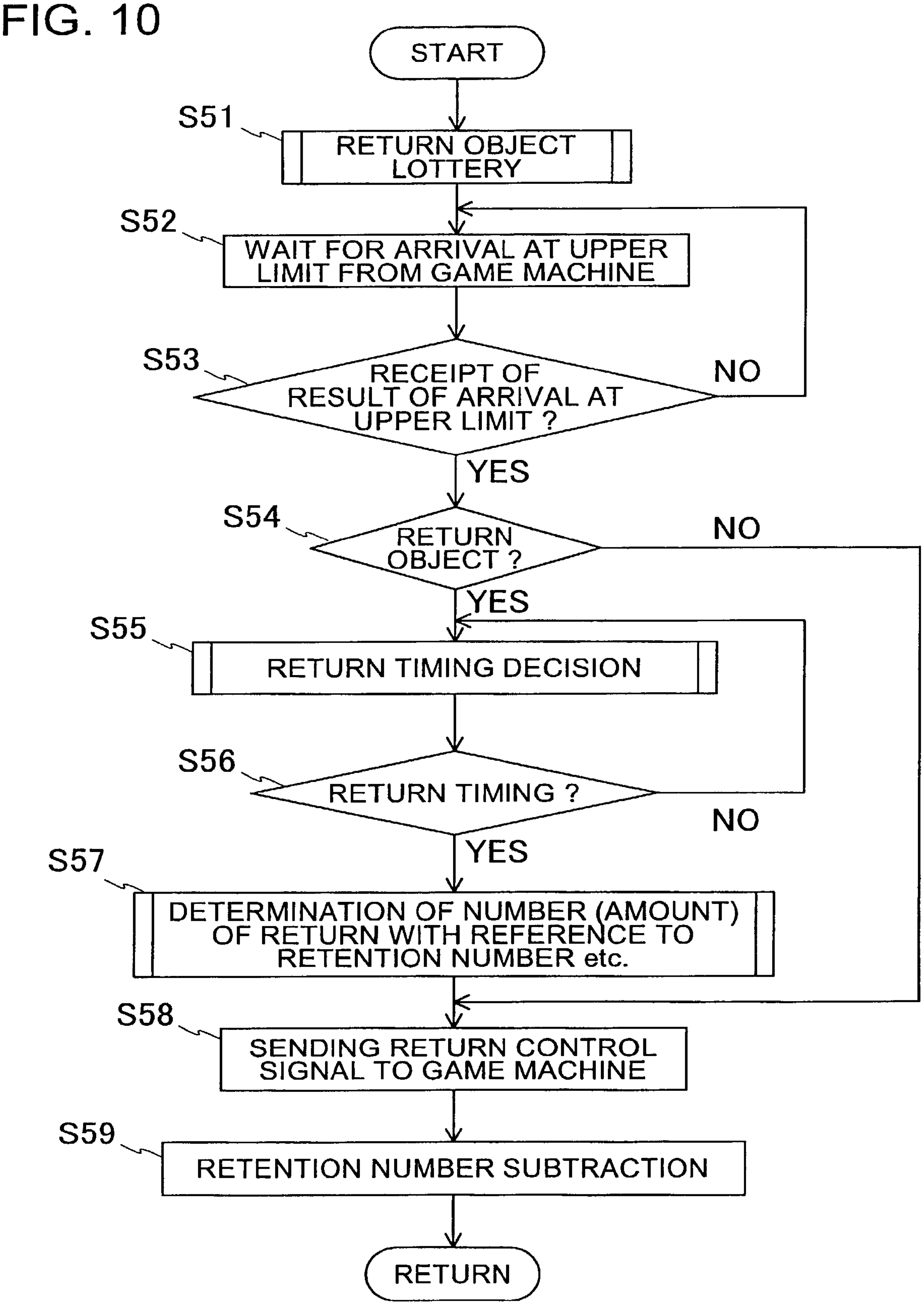
FIG. 10 is a flowchart showing the flow of operation when the game server executes the payout return.

FIG. 10 is a flowchart showing the flow of operation when the game server executes the payout return. This operation is always repeated.

Referring to FIG. 10, firstly, the CPU 51 of the server 1 performs a process for selecting a return object by lottery (step S51). This return object lottery is mainly performed if the payout return is not necessarily executed to the game machine 2, where the upper limit is reached. By way of example, the lottery may be performed in a manner that: i) “the return is executed to a game machine that is the N-th game machine where the upper limit is reached if counted from now”; or ii) “the return is executed to a game machine that has the last digit of the serial machine number matching with the lottery number.” On the other hand, if the return is always executed to the game machine where the upper limit is reached, for example, the lottery may be performed in a manner that: iii) “the return is executed to a game machine that is the first game machine where the upper limit is reached”; or iv) “the return is executed to a game machine which has the last digit of the serial machine number is 0, 1, . . . , or 9 (i.e., to be applied to any serial machine numbers).” These lottery results are stored in the memory 52, based on an instruction of the CPU 51.

Upon completion of the above-mentioned return object lottery process, the CPU 51 enters the state of waiting for the upper limit arrival result sent from each game machine 2 (step S52). As stated above, this upper limit arrival result indicates that the game medium thrown in the game machine 2 reaches a preset amount. It is determined whether the upper limit is reached on the game machine 2. If the upper limit is reached, this result is sent to the server 1 waiting for the upper limit arrival result via the communication interface 53.

When the server 1 is waiting for the upper limit arrival result, the server 1 determines whether the upper limit arrival result is received at a predetermined timing (step S53). The CPU 51 executes the determination. If it is determined that the upper limit arrival result is received, the CPU 51 moves the processing to the step S54. If it is determined that no upper limit arrival result is received, the CPU 51 returns to the upper limit arrival result awaiting process (step S52), and repeats the determination process of the receipt of the upper limit arrival result at the predetermined timing.

Proceeding to the process of step S54, the CPU 51 determines whether the game machine 2 sending the upper limit arrival result is the return object. This determination is executed, based on the data determined by the lottery performed in the above-mentioned return object lottery process (step S51). Thus, the determination is achieved by referring to the data stored in the memory 52 and comparing the reference data with data appended to the upper limit arrival result.

If the lottery is performed in a manner that “the return is executed to a game machine which has the last digit of the serial machine number matching with the lottery number,” as described above, the CPU 51 reads data of the identification number (serial machine number) of the game machine 2 that is appended to the above lottery result, and then determines whether the last digit of the identification number matches with the above lottery number. If the return is always executed for the game machine where the upper limit is reached, a positive result is always obtained in the determination whether it is the return object.

In the above-mentioned return object determination process, if it is determined that the game machine is not the return object, a signal indicating no return execution is sent in the process for sending a return control signal that will be described later. This signal is sent to the game machine 2 via the communication interface 53, based on an instruction of the CPU 51. If a positive result is obtained, the CPU 51 performs a process for determining a return timing (step S55).

The return timing can be set in various manners. For example, to the game machine where the upper limit is reached and which is designated as the return object, the payout return may be forced to be executed after a predetermined lapse of time from completion of all processes with the server. Alternatively, the return may be executed after a predetermined number of games are performed.

The process for determining a return timing is to determine at which timing the return should be executed. If the return timing is predetermined uniquely, this return timing is employed.

Upon completion of the above-mentioned return timing determination process, the CPU 51 determines whether the return timing is established (step S56). The return timing is determined in the return timing determination process (step S55) and stored in the memory 52 of the server 1. For instance, if a temporal timing such as “at the time after a few minutes from when the upper limit is reached” is provided, a timer (not shown) within the server 1 may be used to control this timing. If a timing based on the player’s game circumstances such as “when the player performs twenty games after the upper limit is reached” is provided, various sensors within the game machine 2 may be used to determine whether the predetermined condition is satisfied so that a signal is sent from the CPU 33 of the game machine 2 to inform server 1 of the timing.

If it is determined that the return timing is not established since the process is performed after a provisional return timing, the CPU 51 returns the processing to step S55 so that the processing from step S55 is repeated. If it is determined that the return timing is established, the CPU 51 performs a process for determining the amount of payout return by referring to the game medium retention amount (number) and so on obtained in step S43, as shown in FIG. 9 (step S57).

The game medium retained in the retention process shown in FIG. 9 (step S43) is applied to the amount of payout return to the game machine 2. When the upper limit is reached, the payout return is usually executed for the amount obtained by multiplying the upper limit by the preset return rate. The server 1 basically calculates the return amount based on the upper limit data and return rate data that are contained in the upper limit arrival result sent from the game machine 2. On the other hand, as the result of the above-mentioned return timing lottery, if there is a prolonged period of time between the upper limit arrival and execution of the return, the player waits for the return while performing a game. Therefore, it may be considered to increase the return amount depending on the credit number consumed after the upper limit is reached. For the purpose of this, the server 1 may increase the return amount somewhat or increase the return rate in the return amount determination process (step S57) in consideration of the credit number consumed after the upper limit is reached.

It can also be considered to change the return rate depending on the upper limit value, in order to produce higher game characteristics. In this instance, without using a predetermined return rate, the return rate should be changed depending on the result of lottery that is performed on the server 1 under the collective control of the plural game machines 2.

A manner of producing higher game characteristics by changing the return rate will be described later.

Upon completion of the above-mentioned return amount determination processing, the CPU 51 sends a return control signal to the game machine 2 (step S58). This return control signal may be categorized into two types, according to the result of the above-mentioned return object determination process (step S54). Specifically, the value of "1" may be given to the game machine which is determined to be the return object in the above-mentioned return object determination process (step S54). Hence, the value of "1" is a data indicating that this game machine is the return object, which is appended to a part of the return control signal. On the other hand, the value of "0" may be given to the game machine which is determined to not be the return object. Hence, the value of "0" is a data indicating that the game machine is not the return object, which is appended to a part of the return control signal. In the instance that the return is always executed to the game machine where the upper limit is reached, the value of the return control signal may be set to "1".

The return control signal contains a data for determining the degree of the return (the return amount). All data included in the return control signal are sent via the communication interface 53 based on an instruction of the CPU 51 of the server 1.

Upon completion of the above-mentioned control signal sending process, the server 1 subtracts a retention number (step S59). The retention number may mean the amount of game medium retained in the memory 52 of the server 1. The retained game medium may be used for the return to each game machine 2. It is therefore necessary to perform subtraction of the game medium amount data corresponding to the return amount.

The CPU 51 executes the retention amount subtraction process, and the game medium amount data in the memory 52 is updated after the subtraction processing.

If the return amount to the game machine 2 is changed depending on the play status, it may be constructed that the subtraction processing is performed after a data is received, which indicates the return amount to the player performing a game with the game machine 2 and is sent to the server 1 by the CPU 33 of the game machine 2 when the return to the game machine 2 is completed.

Upon completion of the above-mentioned retention amount subtraction process, the CPU 51 of the server 1 returns the processing to step S51, and repeats the processing from the step of return object lottery.

9. Flow of Upper Limit Setting Processing

The upper limit can be set by a method of using a predetermined upper limit value, or a method of using the upper limit value determined by lottery on the server or the like. Since the former method is already described, the latter method will be explained hereafter.

Figure 11:
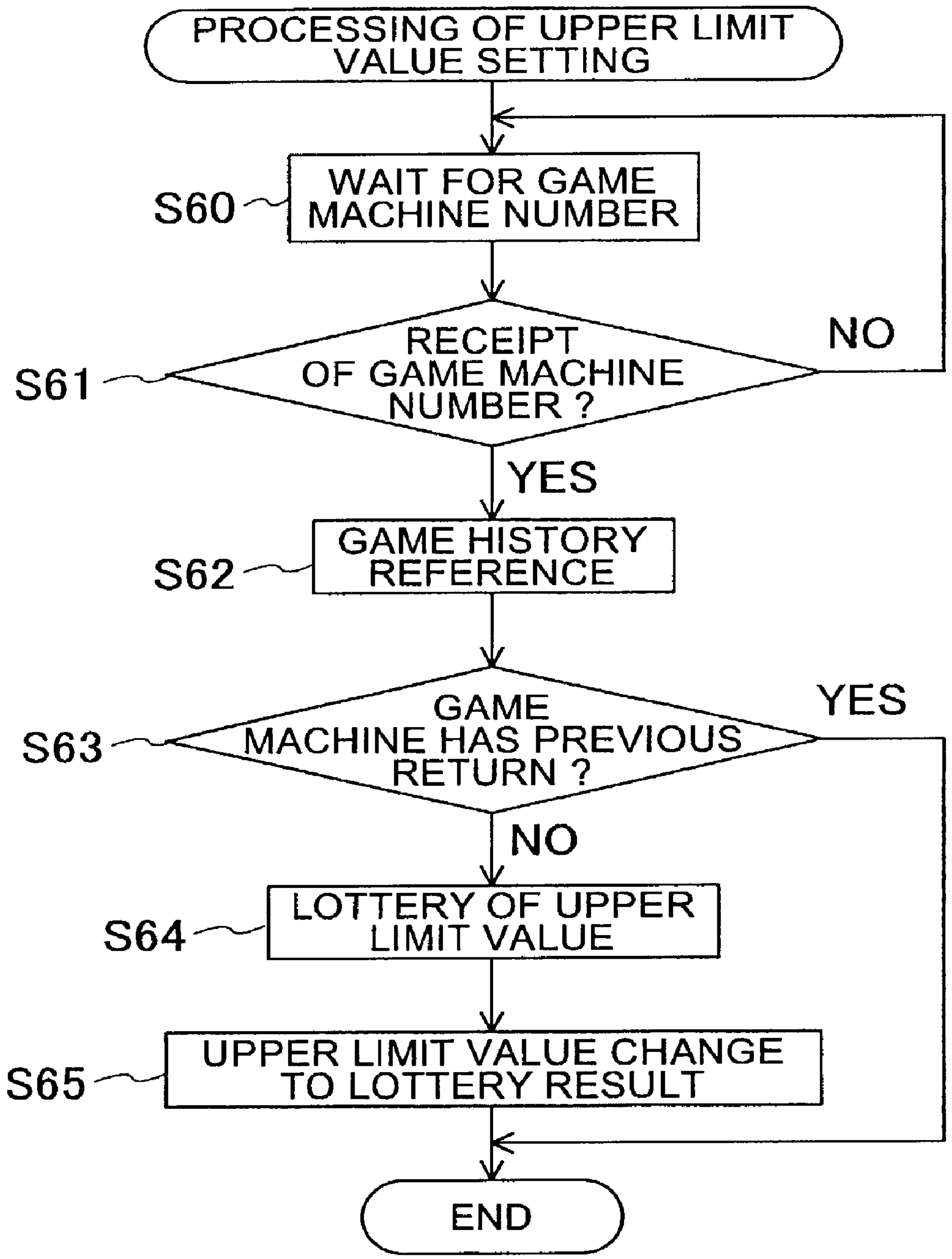
FIG. 11 is a flowchart showing the flow of operation when the game server sets an upper limit value.

FIG. 11 is a flowchart showing the flow of operation when the game server sets the upper limit value. This flowchart corresponds to the subroutine of the upper limit value setting processing shown in FIG. 7 (step S21).

The server 1 enters the state of waiting for a game machine serial number assigned to each game machine 2 under the control of the server 1 (step S60).

As described above, the server 1 controls the game machine group comprising plural game machines 2. It is therefore necessary to identify one game machine to set the upper limit value from the plural game machines. The game machine 2 to set the upper limit value sends, based on an instruction of the CPU 33 of this game machine 2, its machine serial number to the server 1 via the communication interface circuit 41, network NT, and communication interface 53 of the server 1.

As used herein, the game machine to set the upper limit value may include i) the game machine with which it is determined that the player is changed in the player identification process (step S20); or ii) the game machine where the upper limit set previously is reached. The game machine serial number data is sent together with i) a signal indicating the player change; and ii) the player's information data. That is, the upper limit value setting with the game machine 2 is executed i) when there is player change; or ii) when the upper limit set previously is reached.

When the server 1 enters the state of waiting for a game machine serial number assigned to each game machine 2, the CPU 51 determines whether a game machine serial number is received (step S61). If it is determined that no game machine serial number is received, the CPU 51 returns the processing to step S60 and waits for the game machine serial number again. If it is determined that a game machine serial number is received, the CPU 51 refers to a game history (step S62).

As stated above, the flow of the upper limit value setting process corresponds to the subroutine of step S21 shown in FIG. 7. Therefore, the game machine 2 may perform the processing of step S21 for the first time, or it may perform the processing of step S21 again after the return processing (step S30) has been made.

The game history reference is to know how the game machine 2 reaches the upper limit value setting process (step S21). This is also to prevent dual changes of the upper limit value with the game machine 2 where the upper limit has not yet been reached since it is possible to set the upper limit after execution of the return, as described later.

The game history is stored in the database 54 of the server 1, and the CPU 51 of the server 1 executes its reference processing. The game history may include i) the past upper limit values; and ii) data indicating whether the return has been executed (return history data).

Referring to the game history, the CPU 51 determines whether the return has been executed to the game machine 2 at the previous upper limit arrival (step S63).

A data indicating whether the return has been executed is stored in the column of "the past execution of return" in the above-mentioned return game history data. Specifically, in the presence of the return, the data of "1" may be given to the column, whereas in the absence of the return, the data of "0" may be given to the column.

If the return is executed after the previous upper limit arrival, the CPU 51 determines that a new upper limit value has been set thereafter and completes the upper limit value setting process. If it is determined that no return has been executed after the previous upper limit arrival, the CPU 51 determines an upper limit value by lottery (step S64). This upper limit value lottery is executed by selecting randomly one from a certain range of numerical values (e.g., 1 to 200), under a program for the upper limit value lottery stored in the memory 52. These numerical values are expressed in thousands of yen. For example, when "10" is selected by lottery, the upper limit value is ten thousand yen (¥10,000).

Here, the upper limit value may not necessarily be given by the amount of money. The upper limit value may be given, for example, by i) the number of medals that can regarded as a game medium; ii) a play period of time; or iii) the number of plays to be played.

Upon completion of the above-mentioned lottery processing, the server 1 changes the upper limit value to the lottery result (step S65). This upper limit value change is executed by storing, under the control of the CPU 51, the new upper limit value in the column of "the upper limit" in the game history of the database 54. This upper limit value is also sent to the game machine 2.

The upper limit value may be set after the predetermined return is executed.

Figure 12:
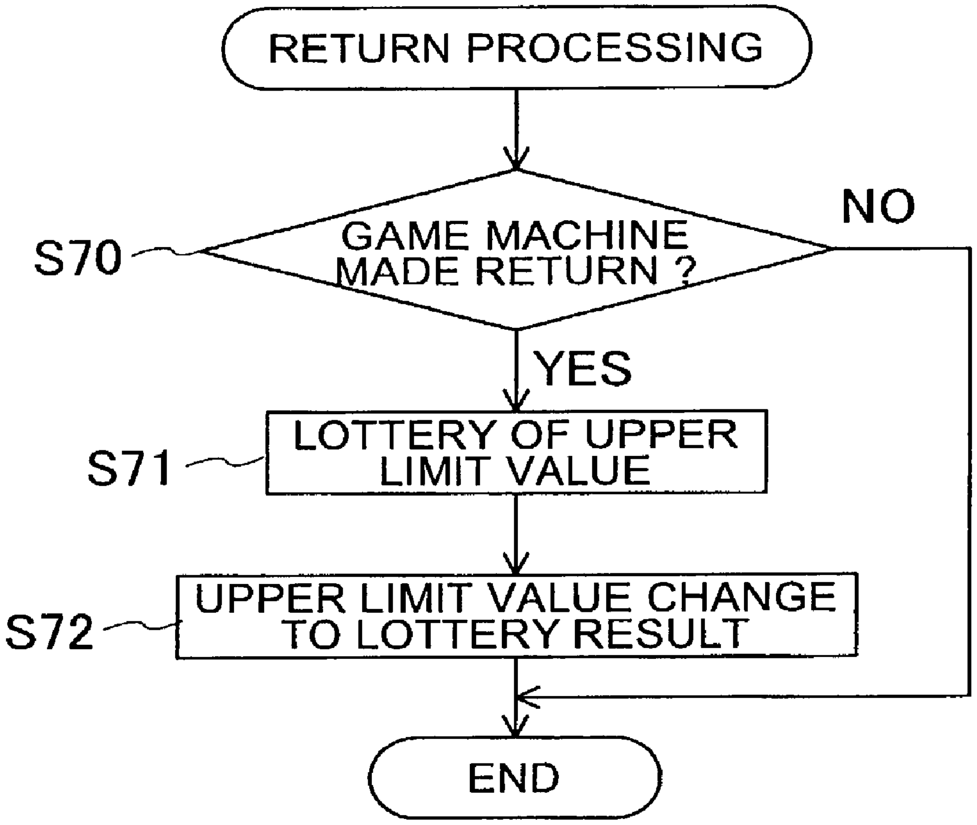
FIG. 12 is a flowchart showing the flow of operation when the game server sets an upper limit value after executing a predetermined payout return.

FIG. 12 is a flowchart showing the flow of operation when the game server sets the upper limit value after executing the predetermined return. This flowchart corresponds to the subroutine of the return processing shown in FIG. 7 (step S30). That is, the upper limit value setting after executing the return is included in the processing of step S30, as a return processing.

Referring to FIG. 12, the server 1 firstly determines whether the return is executed to the game machine 2 (step S70). The presence or absence of the return is recorded (stored) in the above-mentioned return history. Specifically, the data of "1" in the column of "the past return" of the return history indicates that return has been executed, whereas the data of "0" indicates that no return has been executed. The CPU 51 of the server 1 determines whether the return has been executed. If it is determined that no return has been executed, in the upper limit value setting process shown in FIG. 7 (step S21), the upper limit value is set based on the subroutine shown in FIG. 11, and therefore the CPU 51 terminates the processing. On the other hand, if it is determined that the return has been executed, the CPU 51 determines the upper limit value by lottery (step S71). This upper limit value lottery is executed by selecting randomly one from a certain range of numerical values under a program for the upper limit value lottery stored in the memory 52.

Upon completion of the above-mentioned upper limit value lottery processing, the server 1 performs a process for changing the upper limit value to the lottery result (step S72). This upper limit value change is achieved by storing the new upper limit value in the column of "the upper limit" of the game history of the database 54. This upper limit value is also sent to the game machine 2.

The processing of the upper limit value setting after execution of the return is terminated by executing the foregoing sequence of processing.

Further, the upper limit value setting may be executed after the player is brought into an advantageous status (i.e., after obtaining a big prize (big bonus)).

Figure 13:
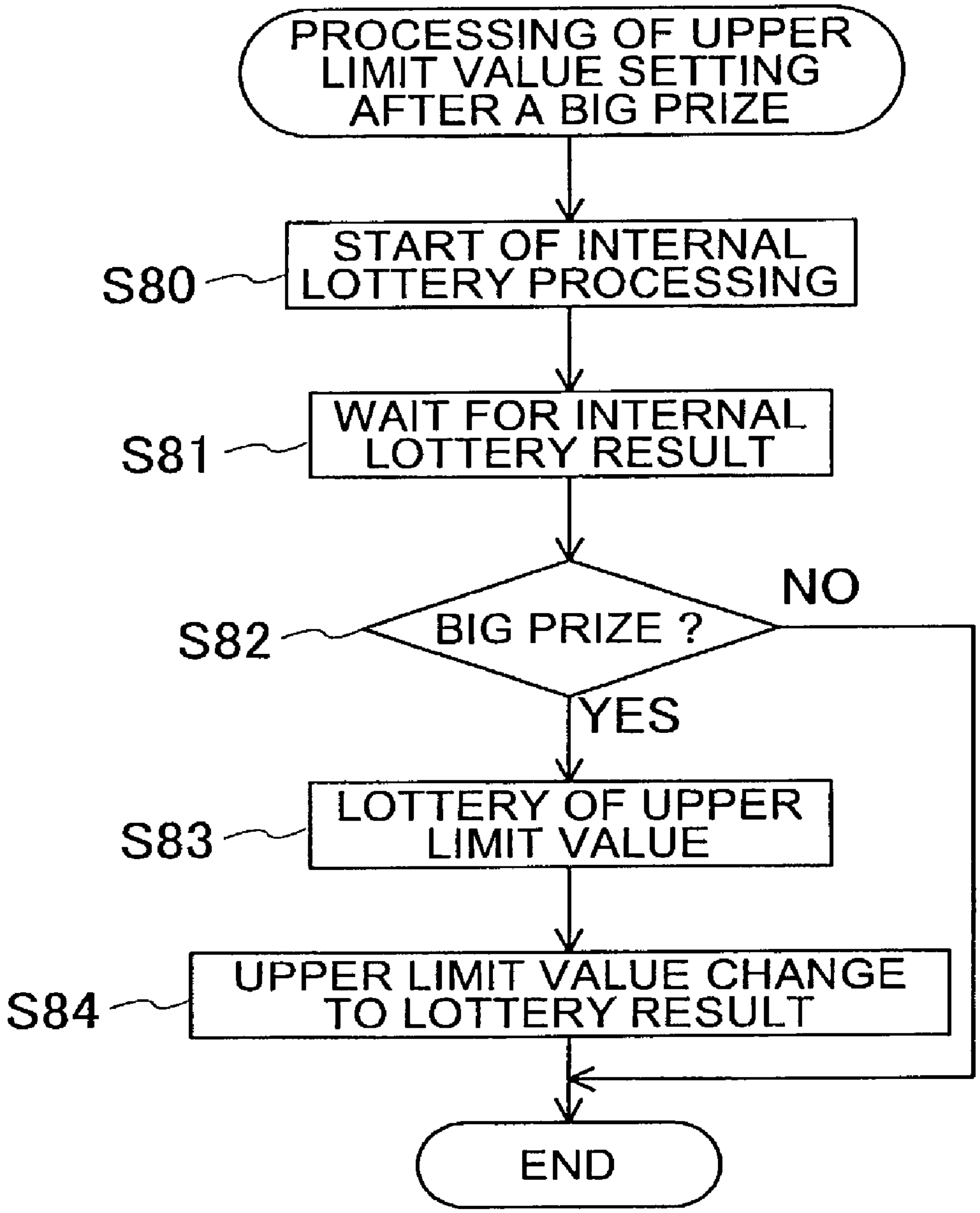
FIG. 13 is a flowchart showing the flow of operation when the game server sets an upper limit value after a game machine is subject to a big prize.

FIG. 13 is a flowchart showing the flow of operation when the game server sets the upper limit value after the big prize occurs with the game machine. This flowchart corresponds to the subroutine of the internal lottery process shown in FIG. 6 (step S13). Although, for convenience in illustration, the flowchart of FIG. 13 is started with the internal lottery processing (step S80), this internal lottery processing is performed at each game machine 2. Therefore, step S81 and latter processes are the operation of the server Referring to FIG. 13, when the internal lottery processing is started, the CPU 51 of the server 1 enters the state of waiting for the internal lottery result (step S81).

When the internal lottery result is sent from the each game machine 2, the CPU 51 determines whether this result is a big prize (step S82). In step S82, if it is determined that it is not a big prize, the CPU 51 terminates this processing. On the other hand, if it is determined that it is a big prize, the CPU 51 executes the upper limit value lottery (step S83). This upper limit value lottery is executed by selecting randomly one from a certain range of numerical values under a program for the upper limit value lottery stored in the memory 52.

Upon completion of the above-mentioned upper limit value lottery processing, the server 1 changes the upper limit value to the lottery result (step S84). This upper limit value change is achieved by storing the new upper limit value in the column of "the upper limit" of the game history of the database 54. This upper limit value is also sent to the game machine 2.

The processing of the upper limit value setting after a big prize is terminated by executing the foregoing sequence of processing.

As described above, the game machine producing higher game characteristics to the player may be provided by properly changing the upper limit value that is employed as a standard for the return. In the game machine constructed so as to notify the degree of the upper limit, the next following upper limit value is clearly displayed to the player, thereby enabling him to perform a game without anxiety. In addition, if the next upper limit value is set at a high value, the player can decide whether he should continue the game or not.

10. Flow of Notification Judgment Processing

The notification in the notification determination process shown in FIG. 6 (step S26) may mean to notify the player that i) the game media (e.g., the number of medals) thrown in the game machine 2 reaches the upper limit; or ii) how many throw-in medals are necessary for reaching the upper limit (in order words, a difference from the upper limit).

This notification may be achieved with the following method that the amount necessary for reaching the upper limit value is indicated by the digital score indicator 19 disposed on the front panel 4 of the game machine 2. For instance, assuming that the number of medals represents the upper limit value, the player should be notified in the following manner. When a gap from the upper limit is indicated, the number of medals insufficient for the upper limit is flashing on and off (blinking) with the display of the score indicator 19. When it is indicated that the upper limit is reached, an indication is also flashing on and off with the display of the score indicator 19. Although in this preferred embodiment, the digital score indicator is employed as notification means, for example, a liquid crystal display for indication may be attached to the front panel 4. In this instance, it is preferable to provide more effective indication of the upper limit arrival on the liquid crystal display. As an example of representation, an expressive character appears on the display.

Although the instance of indicating the number of medals insufficient for the upper limit will be described hereafter, without limiting to this, any indication manner may be employed which is capable of indicating apparently a gap between the upper limit and cumulative credit consumption. There are for example the following manners of: i) indicating both of a predetermined upper limit value and cumulative credit consumption; and ii) indicating a gap to the upper limit by a rate of cumulative credit consumption to a predetermined upper limit (i.e., one that expresses the degree of cumulative consumption in percentage).

Figure 14:
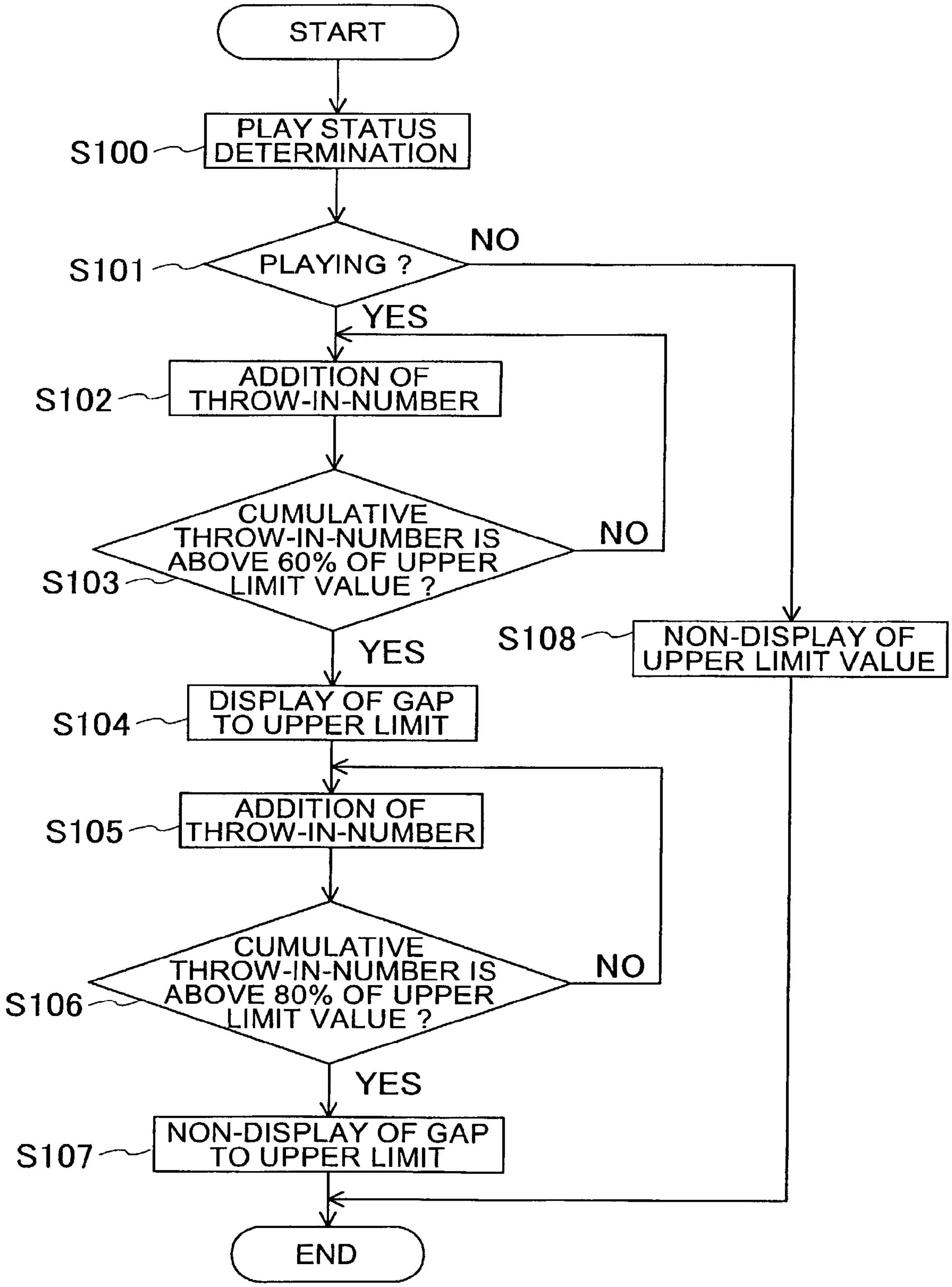
FIG. 14 is a flowchart showing the flow of operation when making a determination of notification.

FIG. 14 is a flowchart showing the flow of operation when the notification is determined.

The server 1 determines whether a notification having contents as described above should be executed to a certain game machine 2, on the basis of the fact that a game is being performed on this game machine 2. In other words, if a game machine with which no game is being performed receives such a notification that there is an extremely large gap to the upper limit on this game machine, a certain player who is going to perform a game on this game machine may, in all probability, give up the game due to this notification. Accordingly, the changeover between indication and non-indication of notification aims at avoiding the above situation and producing higher game characteristics.

Referring to FIG. 14, the server 1 firstly determines a play status of the game machine 2 (step S100). This play status determination is achieved by detecting whether a card is inserted in the card inlet 22 disposed in the game machine 2. As stated above, this card may be an identification card storing the player's personal information, or a prepaid card, or the like in order to purchase a certain amount of game medium before performing a game. This preferred embodiment will be described as applied to the instance of using the above-mentioned identification card.

A card reader 23 for detecting a card insertion is provided with the game machine 2. Specifically, the ROM 36 stores a program to be executed according to an instruction of the CPU 33. Under this program, it is determined that a game is being performed if the card reader 23 detects a card, and that no game is performed if the card reader 23 detects no card.

In this manner, by using the card reader 23 it is determined whether the game machine 2 is in play (step S101). As described above, a card will be detected if the game machine 2 is in play, and no card will be detected if it is not in play. The CPU 33 of the game machine 2 executes this card detection. This card detection result (a card detection signal) is sent to the server 1 via the communication interface circuit 41, network NT, and the communication interface 53 of the server 1. As a card detection signal, the value of "1" is sent as data when a card is detected, and the value of "0" is sent as data when no card is detected.

Upon completion of above-mentioned card detection processing, the server 1 reads the player's information and adds the game medium throw-in number (step S102). The number of medals as a game medium is, as described above, a standard for determining whether the upper limit value should be indicated. The medal sensor in the vicinity of the throw-in slot 15 of the game machine 2 detects throw-in medals, and the detected throw-in number is stored in the RAM 37 according to an instruction of the CPU 33. The past throw-in number data is stored in the RAM 37. The CPU 33 reads this data and adds the current throw-in number thereto, thereby updating the throw-in number data. This updated throw-in number data is stored in the RAM 37. At a predetermined timing, the cumulative throw-in number data stored in the RAM 37 is sent to the server 1 via the communication interface circuit 41, network NT, and the communication interface 53 of the server 1. The sent data is stored in the memory 52, based on an instruction of the CPU 51.

The CPU 33 of the game machine 2 performs processing for adding the game medium throw-in number, to obtain data indicating its cumulative throw-in number. Upon receipt of this data, the server 1 determines whether the cumulative throw-in number reaches 60% or more of the upper limit value (step S103).

As used herein, the expression "60% or more of the upper limit value" is a standard amount for determining whether a gap to the upper limit with a game machine 2 should be displayed on the display part 19 of this game machine 2. The numerical value of "60%" is for the purposes of illustration only and is not to be constructed as a limiting value. It is however preferred to use at least a numerical value of slightly exceeding half the upper limit, in view of the player's psychological lift.

The CPU 33 of the game machine 2 determines whether the cumulative throw-in number reaches 60% or more of the upper limit value. If the CPU 33 determines that the cumulative throw-in number does not reach 60% or more of the upper limit value, the game machine 2 returns the processing to step S102 and performs a process for adding the number of throw-in game media (corresponding to medals in this preferred embodiment). On the other hand, if it is determined that it reaches the 60% or more, the game machine 2 displays the amount insufficient for the upper limit (step S104).

As used herein, the amount insufficient for upper limit may be an amount for indicating how many throw-in medals are required to reach the upper limit value that has been set in step S21 (see FIG. 6). Processing for indicating the amount insufficient for upper limit is executed under a program stored in the ROM 36, based on an instruction of the CPU 33. Specifically, the amount insufficient for the upper limit is calculated (i.e., a numerical value to be calculated by subtracting the cumulative throw-in number from the upper limit value) and the numerical value is displayed on the display part 19 of the game machine 2.

By executing the foregoing processing, the player performing a game with a certain game machine is unaware of a gap to the upper limit with this game machine from the beginning of the game to the arrival at a predetermined status. The player will therefore continue playing the game with excitement, thereby providing the game machine of high game characteristics.

Upon completion of the above-mentioned processing for displaying the amount insufficient for upper limit, the game machine 2 adds the next game medium throw-in number (step S105).

The number of medals as a game medium is a standard for determining whether the upper limit value should be displayed. The medal sensor of the game machine 2 detects throw-in medals, and data of this throw-in number is stored in the RAM 37 according to an instruction of the CPU 33. The CPU 33 executes the following processes for i) reading the past throw-in number data stored in the RAM 37; ii) adding the current throw-in number to update this data; and iii)

directing the RAM 37 to store the updated data. The cumulative throw-in number data stored in the RAM 37 is sent to the server 1 at a predetermined timing. The sent data is stored in the memory 52 based on an instruction of the CPU 51.

The CPU 33 of the game machine 2 performs processing for adding the game medium throw-in number, to obtain data indicating its cumulative throw-in number. Upon receipt of this data, the server 1 determines whether the cumulative throw-in number reaches 80% or more of the upper limit value (step S106).

As used herein, the 80% or more of the upper limit value is a standard amount for determining whether the display status of the gap to the upper limit with a game machine 2, which has been in effect on the display part 19 of this game machine 2 in the above-mentioned processing for displaying the amount insufficient for upper limit (step S104), should be changed to the non-display status. The numerical value of 80% is for the purposes of illustration only and is not to be constructed as a limiting value. In view of the player's psychological rise, it is preferred to use such numerical values giving the player the impression that it is short way to the upper limit.

The CPU 33 of the game machine 2 determines whether the cumulative throw-in number reaches 80% or more of the upper limit value. If the CPU 33 determines that the cumulative throw-in number does not reach 80% or more of the upper limit value, the game machine 2 returns the processing to step S105 and performs a process for adding the number of throw-in game media (corresponding to medals in this preferred embodiment). On the other hand, if it is determined that it reaches the 80% or more, the game machine 2 does not display the amount insufficient for upper limit (step S107). This non-display of the amount insufficient for the upper limit is executed under a program stored in the ROM 36 based on an instruction of the CPU 33. As the result, the display status of the gap to the upper limit on the display part 19 of the game machine 2 is changed to the non-display status.

In the case that no card is detected in step S101, the upper limit value is not displayed, either (step S108).

By executing the foregoing processing, in the absence of player performing a game with a certain game machine, the display state is changed to the state of displaying no information about a gap to the upper limit on this game machine. It is therefore avoidable that a certain player who is going to perform a game with this game machine decides to start a game by checking the upper limit value displayed on the game machine.

11. Operations and Effects

The foregoing preferred embodiment produces mainly the following operations and effects.

(1) In the collective control of plural game machines placed in the same parlor, each game machine detects player change and the cumulative credit consumption on each game machine is managed player by player. Therefore, when the cumulative credit consumption of a certain player reaches a predetermined upper limit, the payout return can be executed to this player. This ensures the return per player, thereby permitting the player to perform a game without anxiety and also inducing the player to continue the game until the return is executed.

(2) The predetermined upper limit value may be changed properly. Thereby, the player performs a game while having the upper limit value on his mind. Therefore, compared to the case of fixing the upper limit value, the player can enjoy more thrilling game, and high game characteristics can be produced.

(3) In spite of the game machine with which the player can perform a game without anxiety, high game characteristics are maintained. It is therefore possible to avoid losing customers, which occurs in the conventional game machine.

While but one embodiment of the invention has been shown and described, it will be understood that many changes and modifications may be made therein without departing from the spirit or scope of the present invention.

There are, for example, the following modifications:

(1) Although the identification card is used for determining whether a game machine is in play, the above-mentioned prepaid card may be used for determining the play status. Preferably, the prepaid card stores an identification number data. In the use of a prepaid card storing no identification number data, although it is hard to identify the player, if it is determined that a game machine is not in play according to a detection signal of the card reader, the game machine can be brought into the non-display status. If it is determined that it is in play, the game machine can be brought into the display status.

(2) Although only as to whether a predetermined upper limit value should be notified or not is mentioned, if it is possible to know a gap between the cumulative credit consumption of the player and the upper limit, the display of this gap can be switched between the display status and non-display status. As a specific means for detecting the above-mentioned gap, for example, the following method may be employed: i) displaying both of a predetermined upper limit value and a cumulative credit consumption; or ii) displaying a gap to the upper limit by a rate of cumulative credit consumption to a predetermined upper limit (i.e., one that expresses the degree of cumulative consumption in percentage).

What is claimed is:

1. A game server that collectively controls plural game machines, each of which starts a game based on a deposit of coins and executes payout based on a result of the game, said game server comprising:

a processor configured to determine a cumulative credit consumption that is an amount of coins deposited for continuously played games on a first game machine by a first player that is performing a game and, when said cumulative credit consumption by said first player who has continuously performed the game with said first game machine reaches a predetermined upper limit as a result of the determination, said processor is configured to cause said first game machine to execute a payout return irrespective of the game result based on a predetermined return rate, wherein the processor is configured to set the predetermined upper limit when performance of the game is switched from a previous player to the first player; and a transmitting device configured to transmit a signal to said first game machine that causes a change in said predetermined upper limit.

2. The game server according to claim 1, wherein said payout return is executed without fail to said first game machine where said predetermined upper limit is reached, based on a result of a timing determination lottery for determining a timing of said payout return.

3. The game server according to claim 1, wherein the transmitting device transmits, when said first player performing the game with said first game machine is changed to a second player, a signal for resetting the cumulative credit consumption of said first player with said first game machine to said first game machine.

4. The game server according to claim 1, wherein said change in said predetermined upper limit is executed after said first game machine is brought into an advantageous state to said first player.

5. The game server according to claim 1, wherein said change in said predetermined upper limit is executed after said predetermined upper limit is reached with said first game machine.

6. The game server according to claim 1, wherein, if a predetermined upper limit is reached with another game machine of said plural game machines, said change in said predetermined upper limit with the first game machine is executed after said payout return is executed to said another game machine.

7. The game server according to claim 1, wherein said change in said predetermined upper limit is executed based on a result of a lottery.

8. The game server according to claim 2, wherein the transmitting device transmits, when said first player performing the game with said first game machine is changed to a second player, a signal for resetting the cumulative credit consumption of said first player with said first game machine to said first game machine.

9. A game machine that starts a game based on a deposit of coins under collective control of a game server together with other game machines, the game machine comprising:

a processor configured to determine a cumulative credit consumption that is an amount of coins deposited for continuously played games on said game machine with which a first player is performing a game and, as a result of the determination, when said cumulative credit consumption reaches a predetermined upper limit, said processor is configured to execute a payout return irrespective of the game result based on a predetermined return rate wherein the processor is configured to set the predetermined upper limit when performance of the game is switched from a previous player to the first player; and an upper limit changing unit configured to cause a change in said predetermined upper limit.

10. The game machine according to claim 9, wherein said payout return is executed without fail when said predetermined upper limit is reached, based on a result of a timing determination lottery executed by said game server in order to determine a timing of said return.

11. The game machine according to claim 9, wherein the processor is configured to reset the cumulative credit consumption of said first player with said game machine in response to a detection that said first player performing the game with said game machine is changed to a second player.

12. The game machine according to claim 9, wherein said change in said predetermined upper limit is executed after said game machine is brought into an advantageous state to said first player.

13. The game machine according to claim 9, wherein said change in said predetermined upper limit is executed after said predetermined upper limit is reached with said game machine.

14. The game machine according to claim 9, wherein said change in said predetermined upper limit is executed, if the upper limit is reached with said game machine, after said payout return is executed to said game machine.

15. The game machine according to claim 9, wherein said change in said predetermined upper limit is executed based on a result of a lottery.

* * * * *